United States Patent
Morisse

(10) Patent No.: US 11,575,806 B2
(45) Date of Patent: Feb. 7, 2023

(54) PRINTING CALIBRATION PROCESS AND METHOD, AND PRINTING SYSTEMS CONFIGURED TO PRINT THEREWITH

(71) Applicant: ESKO Software BVBA, Ghent (BE)

(72) Inventor: Peter Morisse, Bornem (BE)

(73) Assignee: ESKO Software BV, Ghent (BE)

( * ) Notice: Subject to any disclaimer, the term of this patent is extended or adjusted under 35 U.S.C. 154(b) by 0 days.

(21) Appl. No.: 16/972,296

(22) PCT Filed: Jun. 5, 2019

(86) PCT No.: PCT/EP2019/064659
§ 371 (c)(1),
(2) Date: Dec. 4, 2020

(87) PCT Pub. No.: WO2019/234102
PCT Pub. Date: Dec. 12, 2019

(65) Prior Publication Data
US 2021/0136255 A1    May 6, 2021

Related U.S. Application Data

(60) Provisional application No. 62/767,136, filed on Nov. 14, 2018, provisional application No. 62/680,753, filed on Jun. 5, 2018.

(51) Int. Cl.
*H04N 1/60* (2006.01)
*H04N 1/405* (2006.01)
*H04N 1/407* (2006.01)

(52) U.S. Cl.
CPC .............. *H04N 1/603* (2013.01); *H04N 1/407* (2013.01); *H04N 1/4055* (2013.01)

(58) Field of Classification Search
CPC combination set(s) only.
See application file for complete search history.

(56) References Cited

U.S. PATENT DOCUMENTS 7,574,335 B1    8/2009   Estrada
7,830,548 B2   11/2010   Hamburg
(Continued)

FOREIGN PATENT DOCUMENTS

CN    101366267 A       2/2009
DE    102016104215 A1 *  9/2017
(Continued)

OTHER PUBLICATIONS

Curve Pilot 16 User Guide, dated Nov. 10, 2016, 89 pages.
(Continued)

*Primary Examiner* — Barbara D Reinier
(74) *Attorney, Agent, or Firm* — RatnerPrestia

(57) ABSTRACT

A method for calibrating a printing process by applying a selected adjustment curve to an image input file to produce an output file. The adjustment curve is derived to match a target tonal response curve having a function value for 0 that is non-zero or has a discontinuity between 0 and 10%. The adjustment curve has a basic part selected from limited options and an intersecting highlight part derived using a 1-dimensional function having input parameters selected from limited options. The adjustment curve has a starting point (X1, Y1), a highlight curve part having a first slope at the starting point and a first intersection with the basic curve part at (X2, Y2). The first slope and first intersection are among the input parameters selected from limited options. The basic curve part has a second slope at a midrange point (X3>X2, Y3>Y2).

22 Claims, 27 Drawing Sheets

(56) References Cited

U.S. PATENT DOCUMENTS

| | | | |
|---|---|---|---|
| 7,864,373 B2 * | 1/2011 | Donaldson | H04N 1/603 |
| | | | 399/53 |
| 8,717,627 B2 | 5/2014 | Samworth | |
| 2003/0058349 A1 | 3/2003 | Takemoto | |
| 2008/0273052 A1 | 11/2008 | Imhoff | |
| 2011/0216374 A1 | 9/2011 | Samworth | |
| 2011/0216376 A1 | 9/2011 | Rutman | |

FOREIGN PATENT DOCUMENTS

| | | |
|---|---|---|
| WO | 2015175976 A1 | 11/2015 |
| WO | 2017203034 A1 | 11/2017 |

OTHER PUBLICATIONS

Curve Pilot PressSync 16 User Guide, dated Jul. 1, 2016, 54 pages.
IntelliCurve User Guide, dated Jul. 10, 2014, 84 pages.
International Preliminary Report on Patentability for International Application No. PCT/EP2019/064659, dated Dec. 8, 2020, 10 pages.
International Search Report and Written Opinion for International Application PCT/EP2019/064659, dated Sep. 12, 2019, 13 pages.
Chinese Office Action with Search Report for Chinese Application No. 201980043517.X, dated Jun. 16, 2022, with translation, 14 pages.

* cited by examiner

FIG. 24

PRINTING CALIBRATION PROCESS AND METHOD, AND PRINTING SYSTEMS CONFIGURED TO PRINT THEREWITH

This patent application is a U.S. National Phase Patent Application of PCT Application No. PCT/EP2019/064659, filed Jun. 5, 2019, which is related to, and claims the benefit of priority of U.S. Provisional Application No. 62/680,753, entitled PRINTING CALIBRATION PROCESS AND METHOD, AND PRINTING SYSTEMS CONFIGURED TO PRINT THEREWITH, filed on Jun. 5, 2018, and U.S. Provisional Application No. 62/767,136, entitled PRINTING CALIBRATION PROCESS AND METHOD, AND PRINTING SYSTEMS CONFIGURED TO PRINT THEREWITH filed on Nov. 14, 2018, the contents of all of which are incorporated herein by reference in their entirety for all purposes.

BACKGROUND OF THE INVENTION

Understanding of the various aspects of the invention as described herein may benefit from a common understanding of terminology.

Definitions

Tone Response expresses how a specific printing condition prints different tones and is typically represented by a Tone Response Curve that expresses measured Tone Value (Y-axis) versus Tone (X-axis).

Target Tone Response of a printing condition is the tone response of a reference printing condition, assumed by the profile that is used to separate the RGB colors. The actual tone response of a printing condition is controlled towards this target tone response, so that color separation is accurate and so that the printing condition can be easily represented in proofs. A Target tonal response curve comprises a 1-dimensional function, mapping file values to either ink densities or color values (e.g. Delta E-P or Spot color tone value SCTV) expected on the printed result. One family of target tonal response curves are standardized tone response curves as defined by ISO 12647, and as depicted in FIG. 1. These response curves are part of standardized characterization data (e.g. FOGRA39) that describe a standardized printing condition, and may comprise a family of curves A-F, characterized by a relatively simple curve going through (0,0), (100,100) and some midpoint target like (50, 68). By controlling the condition to this target data, the printing condition can be represented by a standardized profile.

Another type of target tone response curves are response curves directly extracted from a reference profile to be matched. This extraction is not always accurate, especially when the profile does not contain spectral data, such as when converting Lab color space values to densities.

Minimum Tone Value is the lightest tone value that can be printed. Minimum gray level of a screen is the screen step that is used to represent the Minimum Tone Value. Dependent on the screening technology used, this minimum gray level corresponds to a minimal dot size (AM screening) or a combination of dot size and dot population (FM screening). Minimum dot size is the smallest dot size that can be used on a flexo plate. This dot size can be expressed as a physical size (e.g. a dot of diameter 50 μm) or the number of pixels of the smallest dot in the digital file.

A transition point in a screen indicates a point where modulation changes from FM to AM (or vice versa). It is sometimes expressed as a number that indicates the size of the smallest dot used in the screen. That size is than expressed as the surface of the dot in pixels.

An adjustment curve is a 1-dimensional function that maps file values (tones) to halftone input values (gray levels of a screen).

Tone or tint is a number used in a design (e.g. in a PDF file) that indicates a ratio of a specific color. Tone Value (TV) is the measured value of a tone printed on a specific media, relative to measured paper and ink solid. This value is obtained by a measurement using a specific metric and normalizing the value to paper and solid using a specific formula.

Traditional metrics and their normalization formulas include:
- Density using a specific density filter
  Formula: Murray/Davies
- Color (CIELab) using specific lightening conditions (e.g. D50), Formula: color difference (e.g. CIE76 or ΔE76) between patch and paper, normalized to color difference between solid and paper
- Color (CIELab) using specific lightening conditions (e.g. D50),
  Formula: SCTV (see ISO 20654/2017)

Tone Value Increment (TVI) is a number that expresses the difference between Tone Value and Tone. This value is also known as 'dot gain. For example, consider a 50% Cyan Tone in a PDF file that when printed on paper measures 68% TV. TVI=18%. This 68% Tone Value is obtained by capturing the reflected density (as the metric) from the tone patch and using the Murray/Davies equation (as the formula) to normalize the value with density of paper and solid. The TVI value is obtained by subtracting Tone from TV.

The Murray-Davies Formula (or Equation) is:
The Murray/Davies Dot Area Equation:

$$\text{Apparent Dot Area} = \frac{1 - 10^{-(D(t)-D(b))}}{1 - 10^{-(D(s)-D(b))}} \times 100$$

Where $D_{(t)}$=Density of film tint
$D_{(s)}$=Density of solid, or D-Max
$D_{(b)}$=Density of film base Curve matching, as is known in the art, comprising using an algorithm to determine from a set of predetermined curves, a curve which matches best a set of points according to minimizing a sum of deviations. The algorithm may exclude outliers or weigh deviations. Exemplary methods for curve matching are described in the Wikipedia definition of "curve fitting," attached as Appendix I, and incorporated herein by reference.

The different parts of any of the foregoing curves may be referred herein to as a "highlight curve part", a "midtone curve part" or "basic curve part," and a "shadow curve part," each referring to the portion of the curve relating to light tones, mid-range tones, and dark tones, respectively.

BACKGROUND

A primary objective of printing, generally, is to reproduce artwork (graphics, text, etc.) into multiple copies while preserving content and color as accurately as possible. One method of making copies is using a printing process that is based on a limited number of process inks (e.g. CMYK), whereby all the different colors of the original artwork are converted into compositions of these process inks. Each unique composition expresses a different tone needed to represent the color. In most cases this conversion from absolute color to the process ink composition is performed using lookup tables, called 'profiles' (e.g. ICC profiles).

Profiles map device-independent RGB colors into device-dependent or printing-condition-dependent CMYK compositions. In many cases a profile for a specific printing condition is created empirically. For example, a profiling chart containing patches with multiple CMYK tone combinations is printed at a specific printing condition, these patches are measured, and a table is constructed relating the CMYK tone compositions and the measured color values. Each color in the artwork can then be converted to CMYK tone compositions via interpolation and inversion.

The profile is only valid if the actual printing condition matches and keeps matching the "reference condition" at which the profile was created. Thus, different printing process properties are controlled relative to this reference.

Tone response is one of the properties that may be controlled for each process ink. Controlling tone response in flexography (further called flexo) is challenging. Flexo is a printing process useful to print on all kinds of soft and hard substrates: plastics, paper, carton, film, metal, and the like, and is often therefore used in product packaging. These substrates have different thicknesses, different surface characteristics, and require compatible inks and inking systems. To transfer ink to such substrates, relief plates (i.e. flexo plates) are used whereby the raised surfaces transfer the ink. These raised surfaces vary in size to obtain various tones of an ink. For flexo, tone response varies considerably from one condition to another, especially in specific tone ranges, highlights, and shadows, dependent on substrate, ink and plate.

The raised surfaces of 3D dot structures on a flexo plate transfer ink directly to the substrate (kiss-printing). To reproduce light tints, small ink doses need to be transferred, so very small surfaces are needed. However, a minimal surface or halftone dot size is required so that the 3D dot structure on the flexo plate is strong enough to withstand the printing condition (printing pressure, tape, substrate hardness, etc.). Accordingly, dedicated adjustment curves are manually constructed that guarantee a minimal dot size and that preserve decent highlight contrast.

For some flexo printing conditions, the ink transferred to large solid objects is not optimal. The inked solids may show pin-holing, and may print with less density than non-solid or screened objects. Another problem is that, dependent on the inking system, halftone holes near solids may start to fill-in, meaning that the density above a specific tone does not increase anymore. Ink transfer can be improved by using surface screening, by using special coated flexo plates, by adapting screen ruling, or by adjusting the inking system (i.e. anilox cell volume). However, these solutions are not always available or possible. For example, surface coated plates or surface screening sometimes interferes with halftone frequency. Surface screening is also not always compatible for a specific ink and paper (e.g. UVInks). Lowering screen ruling compromises precision in highlights and shadows. Finer anilox cell volumes are more expensive and reduce solid density. Therefore dedicated curve adjustment is also needed that limits the size of the maximum dot.

Traditional methods for such curve adjustments are complex and require expert skills. To illustrate this, an example of a traditional adjustment method is now explained for a flexo condition. Consider an exemplary printing condition having a highlight reproduction limitation such that the minimal dot size that holds on plate is 039 μm. Using a 150 LPI AM screen, the gray level of the screen containing this minimal dot size is 4%, as calculated by Equation 1:

$$\text{gray\_level} = ((\text{diameter\_um}/2) * (\text{ruling\_LPI}/25400))^{\wedge} 2 * PI) \quad (1)$$

A patch screened with this gray level and printed measures as having an 8% tone value (TV) (using density as a metric and Murray/Davies as the formula). One traditional compensation method combines two curves: a plate or bump curve and a press curve. An exemplary 'bump' curve, depicted as part of an exemplary computer user interface in FIG. 2, sets the minimal gray level of the screen=4.

The RGB work is separated with a profile that corresponds with the condition. That profile assumes a reference Tone Response curve equal to 'ref.dgc' as depicted in the green dashed line (middle line) in FIG. 3. A press curve is used to compensate for the difference between actual Tone Response versus reference Tone Response. To construct such a press curve, different tones are printed that are already adjusted with the plate curve. The measured Tone Value for each tone is plotted on a curve, as depicted in the 'Measured Points' table and red dashed line (top most line) in FIG. 3. A compensation curve is calculated that adjusts the gray levels for the different tones in such a way that the Tone Values will match the reference Tone Values. This is the blue (lowermost) line in FIG. 3.

The lowest reachable Tone Value for this condition is 8% (the Tone Value measured for the minimal dot). For tones between 0% and 4% however this TV is higher than the desired TV. So a compensation algorithm attempts to reduce the gray levels for these tones. However, since gray level is already minimal (plate curve), all tones between 0 and 4% will be adjusted to this minimal gray level, and therefore all tones between 0 and 4% will print equal without highlight contrast. This is visible on the compensation curve in the FIG. 3, in which the curve is nearly flat for tones below 5%. To correct this, the adjustment curve has historically been 'tweaked' or 'modified' manually.

For example, as shown in FIG. 4, a special 'Bump Highlights' feature may be used that modifies the adjustment curve to improve highlight contrast, thereby increasing the slope of the compensation curve. Thus, as the foregoing example illustrates, setting up curves for adjusting conditions with tone range limits is quite complex and requires expertise. Furthermore, the Tone Values printed as a result of the adjustment curve will deviate from the desired Tone Values expressed in the reference tone response curve, increasing the difficulty of making accurate proofs for this printing condition. While such proofs use the printing condition profile, that profile assumes tone response is equal to the reference tone response. An extra curve may be used for proofing to mimic highlight behavior of the printing condition.

SUMMARY OF THE INVENTION

One aspect of the invention comprises a method for calibrating a printing process. The method includes determining a target tonal response curve for the printing process, the target tonal response curve having a function value for 0 that is non-zero or having a discontinuity between 0 and 10%. The method also includes deriving, using curve matching, an adjustment curve that when used in the printing process matches the determined target tonal response curve, and adjusting one or more data values in a digital image input file by applying the selected adjustment curve to produce a digital image output file. The adjustment curve has a basic part, a highlight part that intersects with the basic part, and a shadow part that intersects with the basic part. The highlight part and the shadow part are derived using a 1-dimensional function having one or more input parameters selected from a limited set of options. Each curve has a starting point having a first x-value and first y-value. Each curve also has a highlight curve part having a first slope at the starting point and a first intersection of the highlight curve part with a basic curve part, the first intersection having a second x-value and second y-value. The first slope and the first intersection are among the input parameters selected from the limited set of options. The basic curve part has a midrange point in a middle-range of the adjustment curve. The midrange point has a third x-value and a third y-value respectively greater than the second x-value and second y-value, and has a second slope at the midrange point. The basic curve part is selected from a predetermined family of adjustment curves limited in number. A shadow curve part has a third slope at an end point and a second intersection of the basic curve part with the shadow curve part. The second intersection has a fourth x-value and a fourth y-value respectively greater than the third x-value and third y-value. The third slope and the second intersection are among the input parameters selected from the limited set of options. The end point has a fifth x-value and fifth y-value respectively greater than the x-values and y-values of all points on the adjustment curve. The method comprises.

The method may further comprise determining a function value of the starting point by determining a stable printing gray level. Determining the stable printing gray level may comprise determining a lightest stable printing dot size by automatically measuring and comparing printed tone values for different dot sizes. Determining the stable printing gray level may comprise automatically measuring and comparing printed tone values for different combinations of dot size and dot populations. The method may further comprise implementing the lightest stable dot size in a screen and implementing a corresponding dot population as a minimum gray level in the adjustment curve. The function value of the end-point may be determined from the gray level that prints with a highest density.

The method may further comprise selecting a reference target tonal response curve for each process ink matching a print condition and a reference profile. In one embodiment, the reference target tonal response curve is modified with a highlight point from a power function. In another embodiment, the reference target tonal response curve can be modified with multiple points, such as a highlights point and the transition point of the screen, using a Bezier spline function.

The adjustment curve may be selected from a predetermined family of curves, the family comprising a set of predetermined basic curves continuous from 0% to 100%, modified with different highlight part shapes using Bezier spline functions. The curves in the family may allow a variable curve start point other than (0,0), a variable curve end point other than (100,100), or a combination thereof.

The step of deriving the adjustment curve may comprise the steps of calculating a theoretical set of adjustment points, the calculation comprising interpolating between measured values to match the target tonal response curve and determining the third x-value, third y-value, and second slope of the midtone point by selecting a curve from the family of curves that best matches the adjustment points in a midtone range U to V, where U>15% and V<85%. The first x-value, first y-value is set as the starting point identified by determining a stable printing gray level. The first slope at the starting point and the second x-value, second-y-value of the first intersection are selected that when combined with the midtone point, best match the adjustment points in a highlight range U to V, wherein U>starting point and V<50%. The fifth x-value, fifth y-value is set to the end point identified by determining a gray level that prints with a highest density and the third slope at the end point and the fourth x-value, fourth y-value of the second intersection are selected that when combined with the midtone point, best match the adjustment points in a shadow range U to V, where U>50% and V<end point.

The step of deriving the adjustment curve may comprise calculating a theoretical set of adjustment points, the calculation comprising interpolating between measured values to match the target tonal response curve, setting the first x-value, first y-value to the starting point identified by determining a stable printing gray level, setting the fifth x-value, fifth y-value to the end point identified by determining a gray level that prints with a highest density, and determining all other points and slopes by selecting a combination that best matches the adjustment points in a range U to V, where U>start point and V<end point.

The method may comprise measuring a press profile, wherein the measuring comprises the steps of printing a color target using the selected adjustment curve and the implemented screen; measuring a color profile from the printed color target; extracting from the color profile an actual tonal response; comparing the actual tonal response with the target tonal response; and updating the measured color profile mathematically via interpolation to match the target tonal response.

In a printing process comprising a multi-ink printing process, the method may comprise selecting the adjustment curve for a first ink used in the multi-ink printing process and using the selected adjustment curve for a second ink used in the multi-ink printing process. Or, in a multi-ink printing process, a first adjustment curve may be selected for a first ink used in the multi-ink printing process via the method described above, and the same method may be repeated to select a second adjustment curve different than the first adjustment curve for a second ink used in the multi-ink printing process.

The method may further comprise printing a printed image from the digital image output file.

Another aspect of the invention is a method for adjusting color tones of an input digital image file to create an adjusted digital image file, using a computer system programmed with instructions for selecting curves that are a best fit to data, each curve specifying an adjusted color tone percentage output as a function of input color tone percentage over a range of input and output values, each of said curves having basic curve shape section, a highlight curve shape section, and a shadow curve shape section. The method comprises storing on the computer system a discrete family of basic curve shape sections, each basic curve shape section characterized by a midpoint adjustment and a curve slope at a predetermined mid-range percentage, each basic curve shape section representing a combination of midpoint magnitude and contrast that is different from the respective combination for any other basic curve shape section in the family. A limited set of highlight parameter options is defined for defining a starting slope at a starting point and a first intersection defined by an intersection of the highlight curve shape section with the basic curve shape section; and a limited set of shadow parameter options is defined for defining an end slope at an end point and a second intersection defined by an intersection of the shadow curve shape section with the basic curve shape section. A plurality of measured data points are received as an input into the computer system, each data point comprising an adjusted color tone percentage output corresponding to an input color tone percentage. The computer determines which basic curve shape section selected from the discrete family of basic curve shape sections coupled with which set of highlight parameters selected from the limited set of highlight parameter options and which set of shadow parameters selected from the limited set of shadow parameter options, for a given user input starting point and user input end point, most closely matches the plurality of measured data points, thereby identifying a selected curve to be applied for adjusting the color tones of the input digital image file to create the adjusted digital image file. The starting point location may represent a minimum tone and a minimum gray level. The end point location may represent a maximum tone and a maximum gray level.

Still another aspect of the invention comprises machine-readable media comprising fixed machine-readable instructions for causing a machine to perform the foregoing method. Yet another aspect of the invention comprises a printing system comprising a computer processor programmed with such machine-readable media, the system further comprising an output device configured to create an output using the adjusted digital image file. The output device may comprise a printing press configured to print using a plurality of inks. The instructions fixed in computer processor may be configured cause the processor to perform the method by selecting the adjustment curve for a first ink of the plurality of inks and then using the selected adjustment curve for a second ink of the plurality of inks. The instructions fixed in computer processor may also or instead be configured cause the processor to perform the method steps to select a first adjustment curve for a first ink used in the multi-ink printing process, and repeat the method steps to select a second adjustment curve different than the first adjustment curve for a second ink used in the multi-ink printing process.

Still another aspect of the invention comprises a computer-implemented method for calibrating a printing process for a printing condition characterized by a plurality of printing condition parameters, the printing process comprising one or more inks. The method comprises for at least one ink (i) based upon user input information characterizing the print condition, automatically generating a bitmap to be printed; (ii) selecting a non-modified target curve and a measurement metric for the printing condition, (iii) imaging the bitmap to a flexo plate, (iv) printing a sheet using the flexo plate, (v) automatically taking measurements of the printed results using a predetermined tool, and (vi) automatically determining, with a computer processor based on the measurements of the printed results, limits for gray levels including a smallest stable printing minimum dot and dot population, limits for a tone scale, a full tone scale, and optimal highlight technology. A screen containing a mixture of AM and FM screening, including the optimal highlight technology, is then automatically created. A modified target curve based upon the non-modified target curve and the limits for gray levels and the limits for the tone scale is created with the computer processor. The computer processor calculates a theoretical tonal adjustment curve from the measurements corresponding to the full tone scale, and derives an adjustment curve that matches closest to the theoretical tonal adjustment curve using a configurable curve fitting algorithm. The method includes selecting a basic curve portion from a family of predetermined basic curve portions, (ii) fitting a highlight curve portion to the basic curve portion using a Bezier formula with a given starting point input, and with inputs for slope at the starting point and location of an intersection point with the basic curve portion selected from a first limited set of discrete inputs, and (iii) fitting a shadow curve portion to the basic curve portion using a Bezier formula a given end point input, and with inputs for slope at the end point and location of an intersection point with the basic curve portion selected from a second limited set of discrete inputs. The selected adjustment curve is then used for one or more inks used in the printing process other than the at least one ink and/or the foregoing steps are repeated for the printing condition for one or more inks other than the at least one ink, to derive a set of selected adjustment curves comprising one for each ink in the process. Then, the method comprises printing with the set of selected adjustment curves, measuring a press profile, and using the press profile for creating one or more separations, and using the set of selected adjustment curves for making one or more printing plates.

BRIEF DESCRIPTION OF THE DRAWINGS

FIG. 24 depicts an exemplary user interface for displaying an automatically chosen minimum dot and dot population based upon measured results.

DETAILED DESCRIPTION OF THE INVENTION

Figure 1:
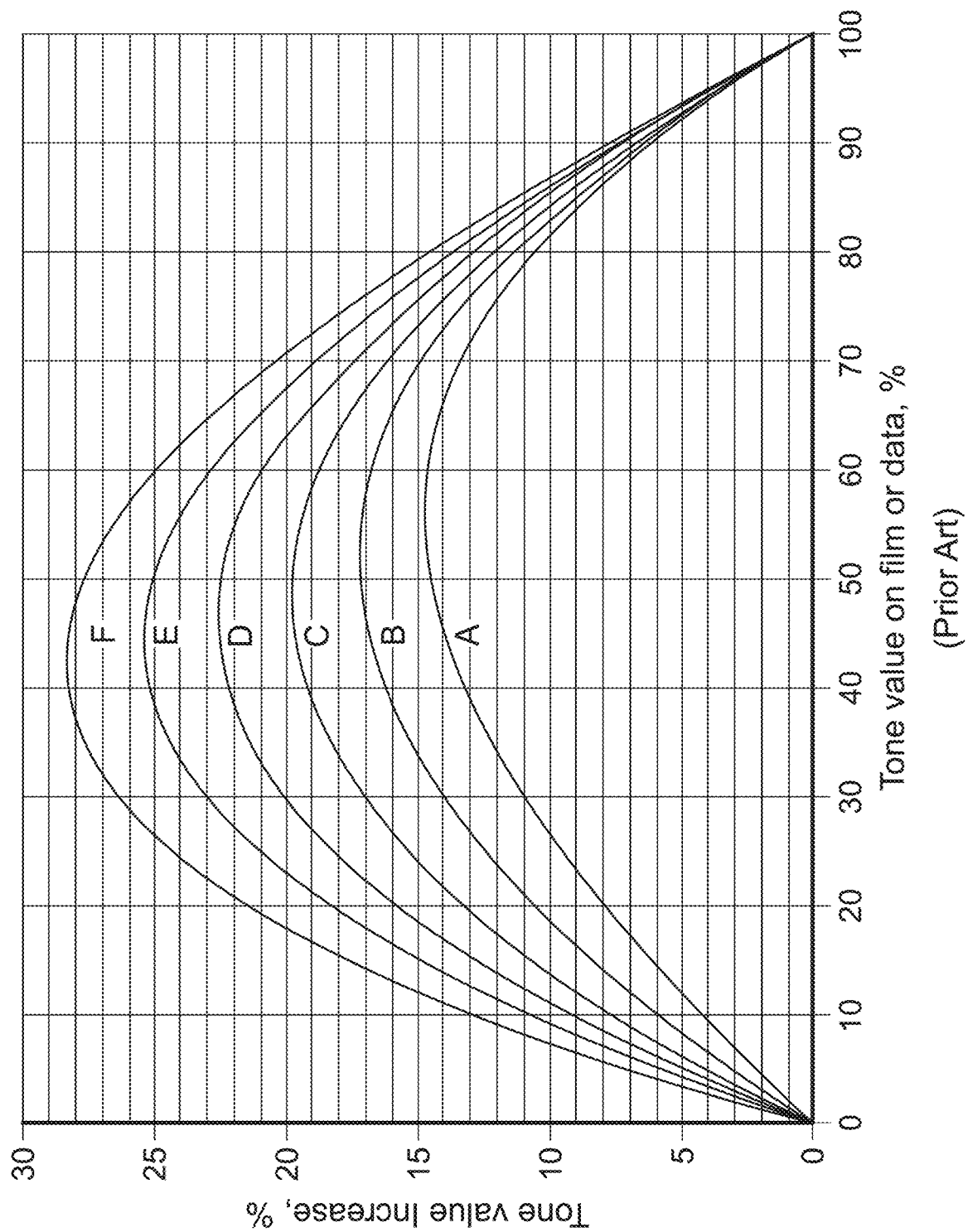
FIG. 1 depicts an exemplary standard set of prior art response curves A-F corresponding to the ISO 12647-2 standard, describing the tone response for different ISO standardized printing conditions.
Figure 2:
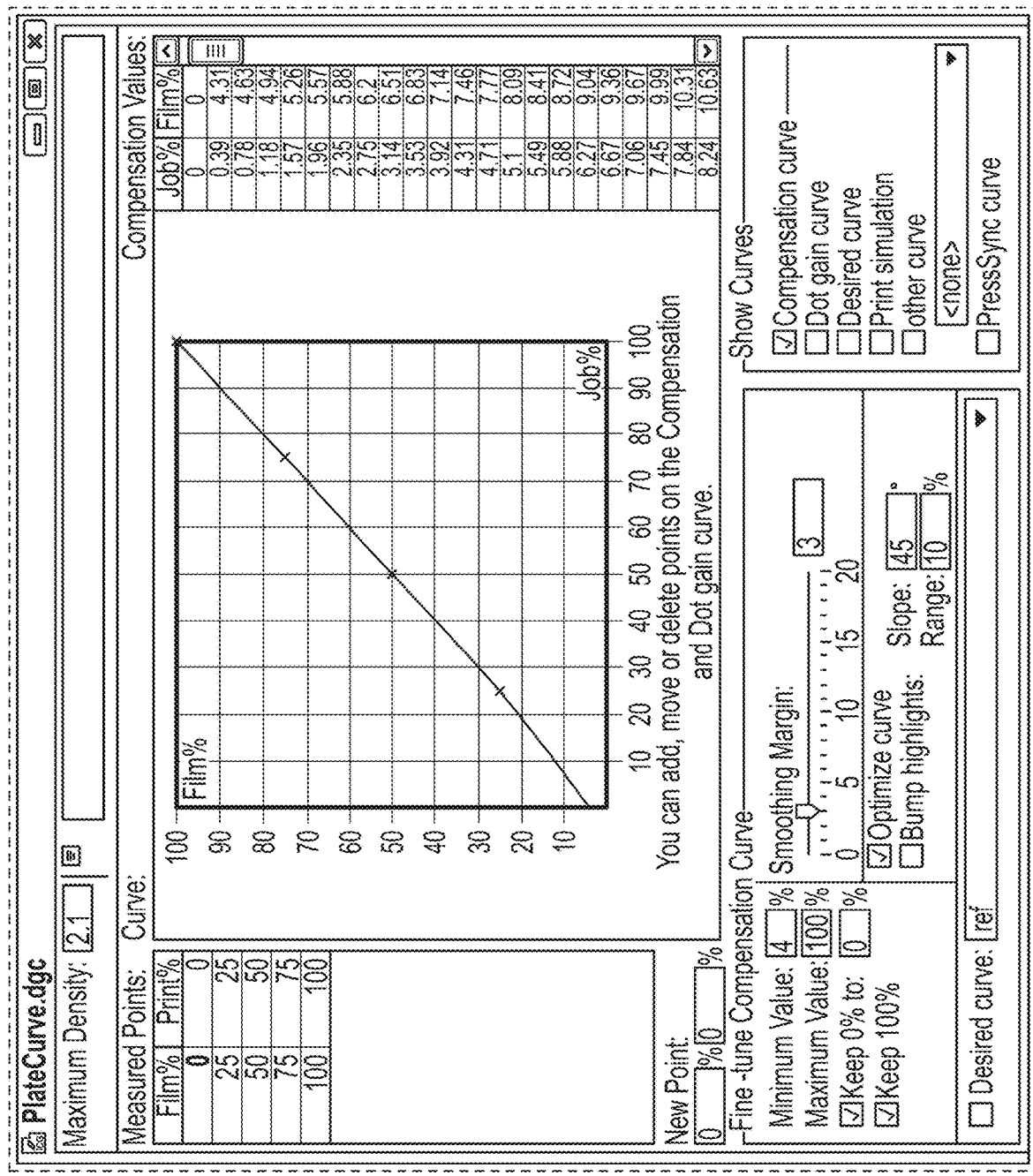
FIG. 2 depicts an exemplary prior art bump curve as displayed on an exemplary computer user interface.
Figure 3:
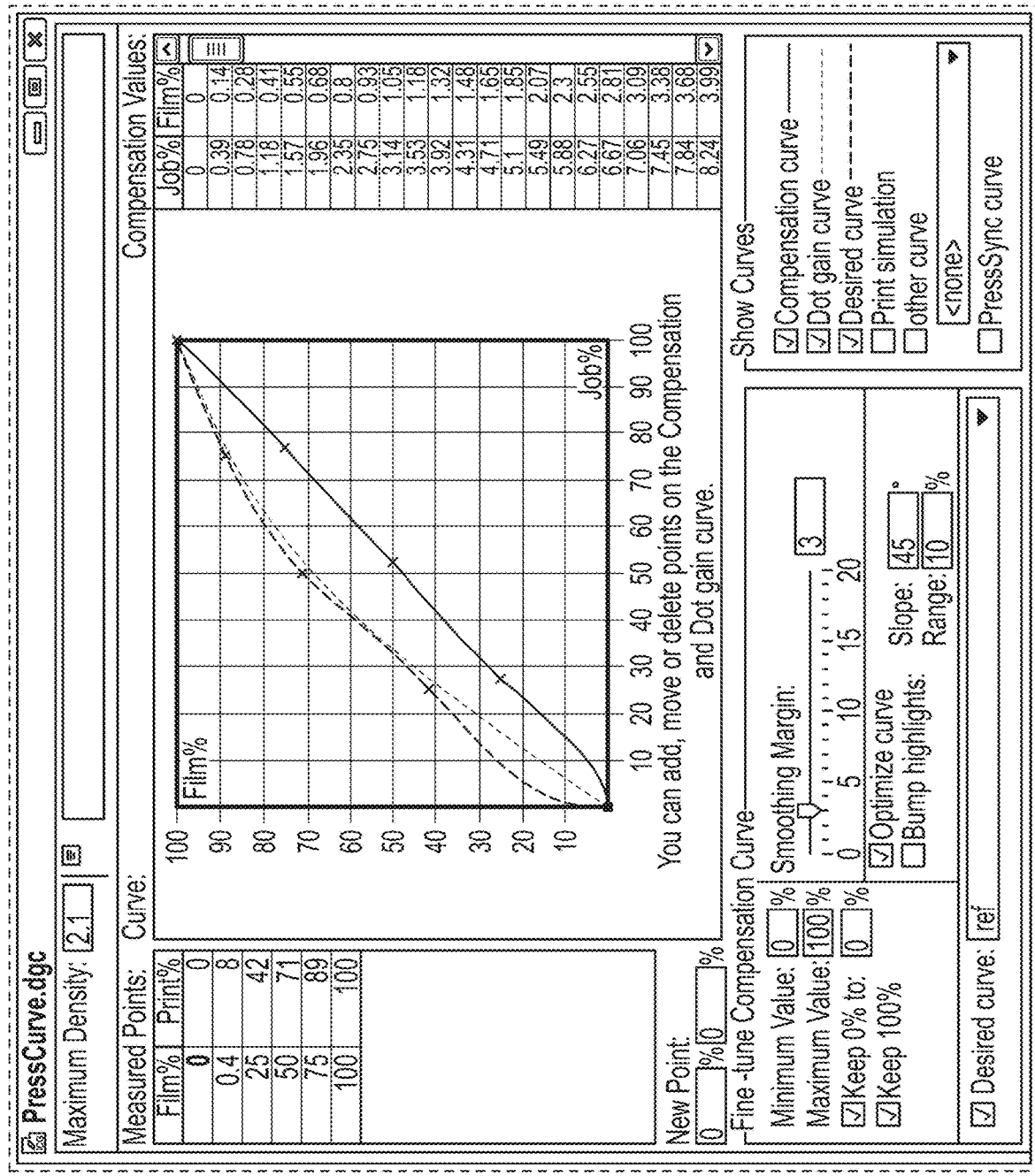
FIG. 3 depicts an exemplary reference tone response curve, exemplary measured tone value points and corresponding curve, and exemplary compensation curve of the prior art, as displayed on an exemplary computer user interface.
Figure 4:
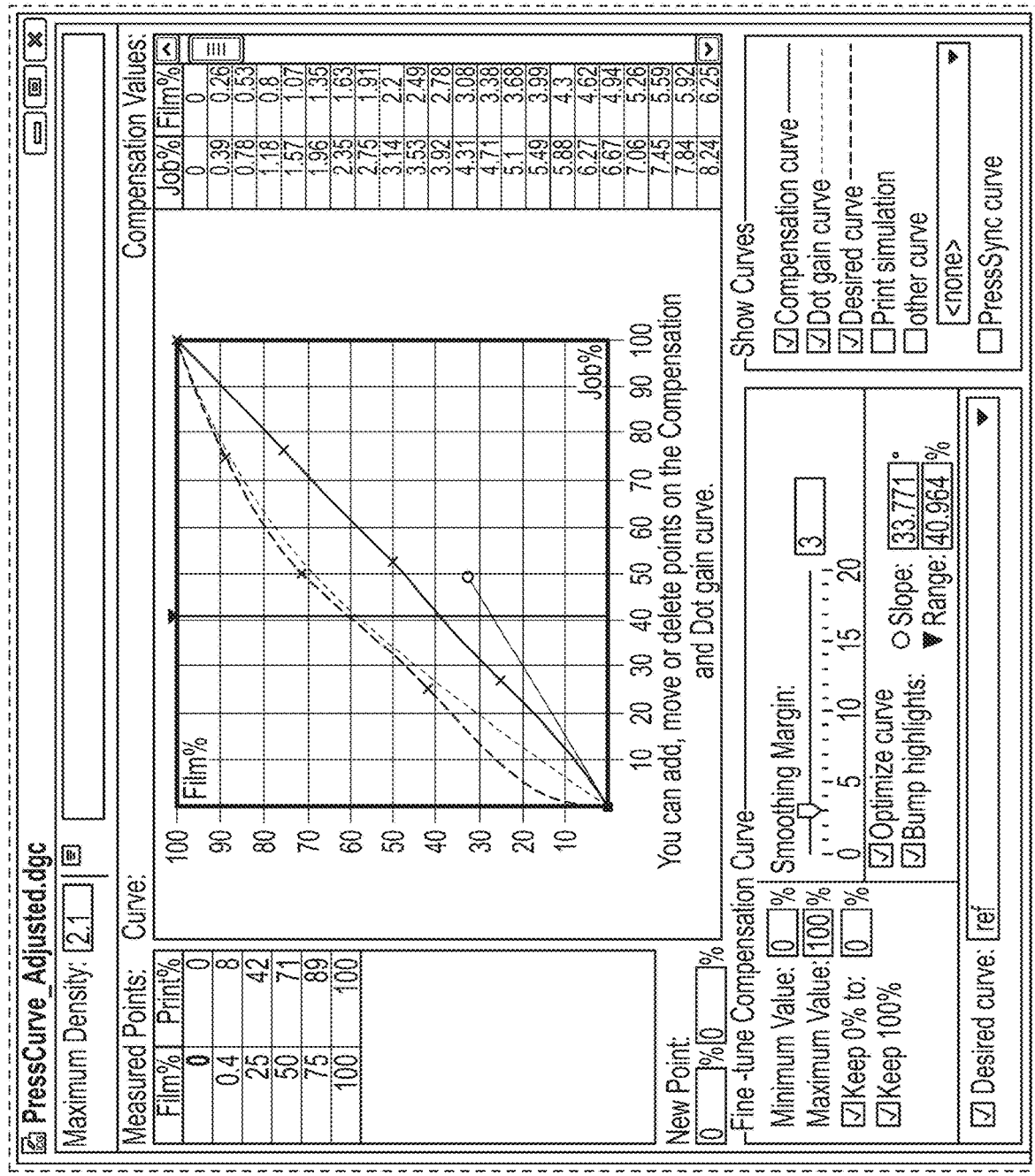
FIG. 4 depicts the exemplary curves of FIG. 3, as modified by an exemplary 'Bump Highlights,' as displayed on an exemplary computer user interface.
Figure 5A:
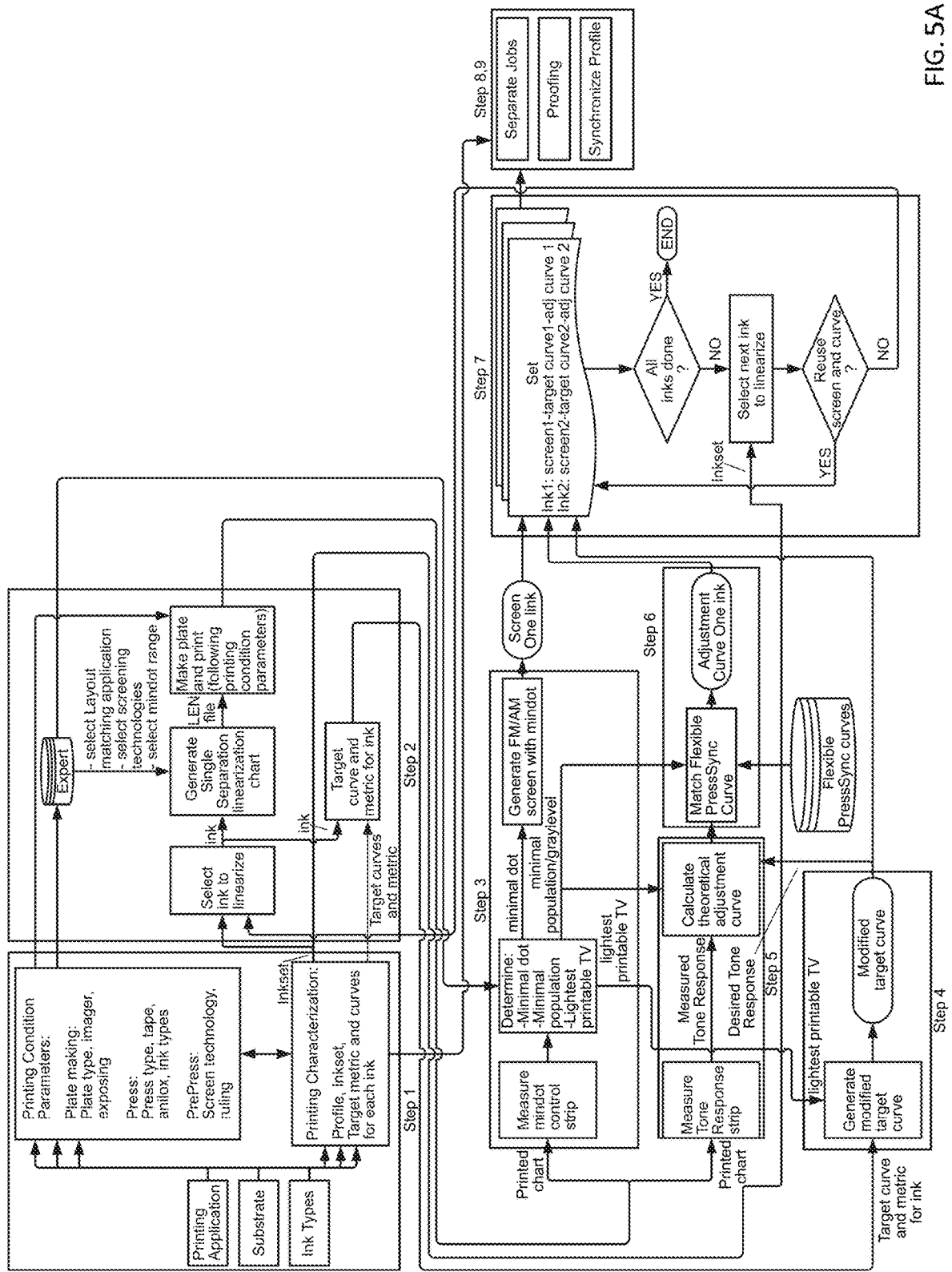
FIGS. 5A-5D depict a flowchart, and respective magnified portions thereof, outlining steps of an exemplary implementation of aspects of the invention.
Figure 5B:
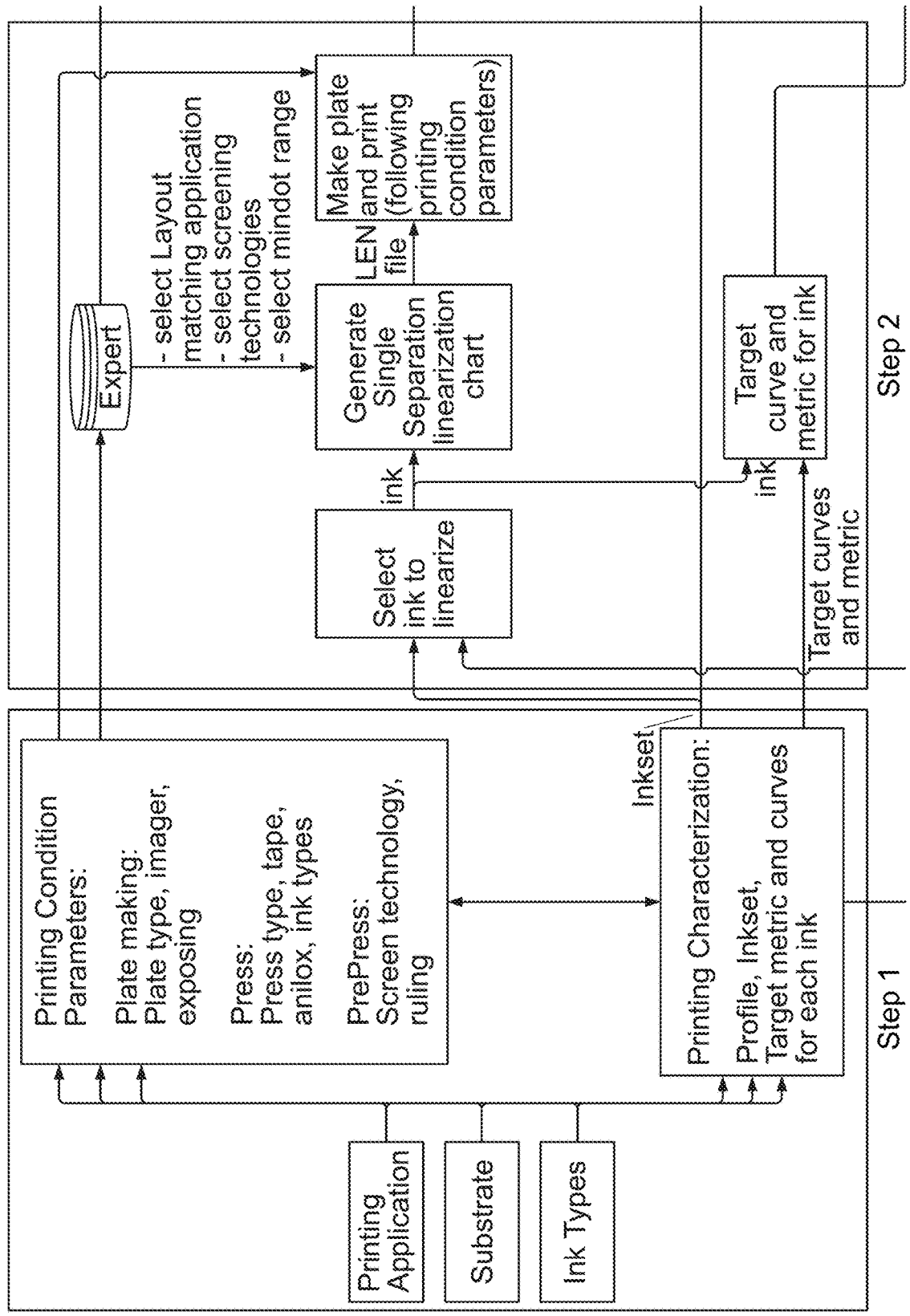
Figure 5C:
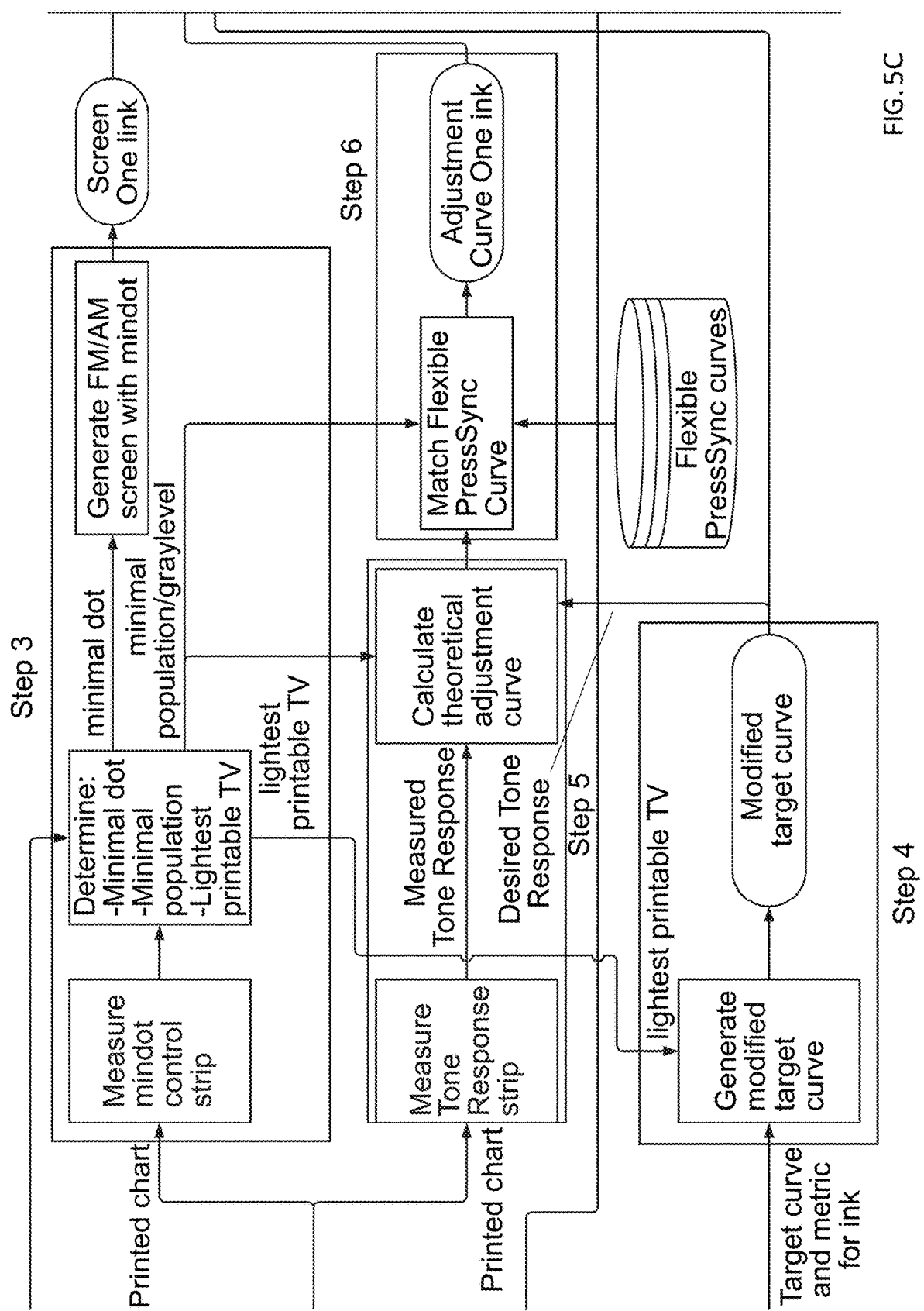
Figure 5D:
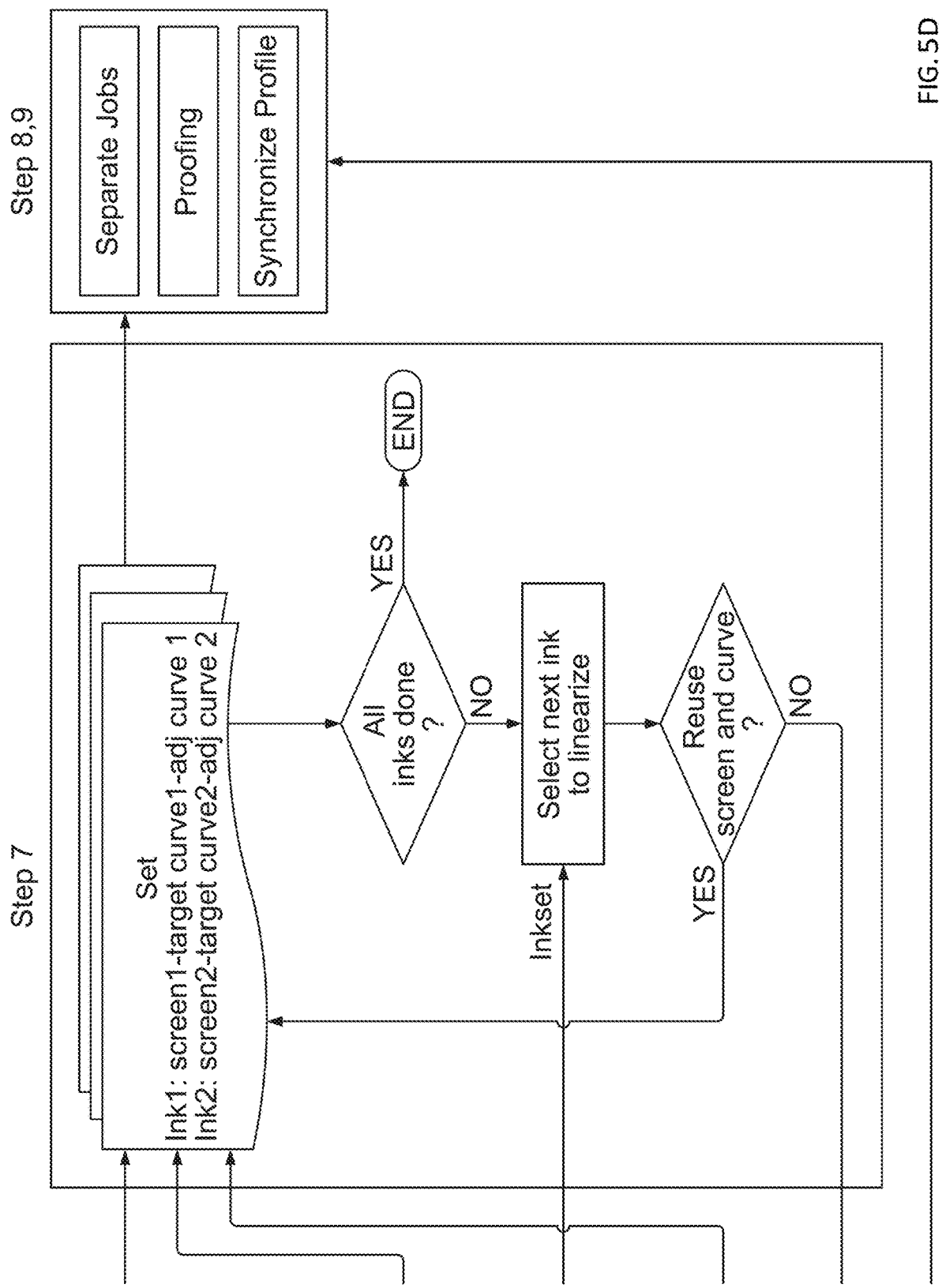

One aspect of the invention seeks to accelerate and standardize the calibration and color optimization process by avoiding manual tweaking and optimization of curves and screening, while at least maintaining the final output quality.

The basic process contains the following steps, which are also illustrated in FIGS. 5A-5D.

In STEP 1, for a specific printing condition, represented by different printing condition parameters, and for one of the inks used for that condition, a screen containing the best physical stable printing minimum dot is created, including an optimized mixture of AM and FM screening. Creation of the screen is performed automatically from measurements on printed results. Screen parameters such as screen ruling and angle are set from specifications in the printing condition.

STEP 2 comprising selecting a suitable target curve and measurement metric for the selected condition and ink. STEP 3 comprises deriving limits for gray levels and limits for tone scale from the measurements and from the screen properties. In STEP 4, the target curve is modified from the derived limits in STEP 3 so that this curve reflects the best realistic and reproducible tonal response for the given print condition. STEP 5 comprises calculating a theoretical tonal adjustment curve from measurements, which would theoretically, when used in plate making, make the printing process reproduce this modified target curve very accurately, at least on the measured values and if the printing conditions are kept extremely stable.

STEP 6 comprises determining from a bundle of predetermined adjustment curves, using a configurable curve fitting algorithm, the adjustment curve which matches closest to the previously determined theoretical adjustment curve. STEP 7 comprises re-using the adjustment curve obtained for the selected ink for the other inks. Or, in the alternative, the process can be repeated (partially) for other inks printed on the same printing condition. These processes lead to for each ink a screen and an adjustment curve from the predetermined bundle. STEP 8 comprises printing with the found adjustment curves and measuring a new press profile. STEP 9 comprises using the new press profile for separating and using the adjustment curves for plate making.

The resulting print made using the foregoing method will be superior to prior art processes because the process is highly automated and repeatable without requiring skilled experts to adjust the curves. STEP 1 to 6 may be performed automatically by a computer programmed with software instructions, without human intervention. Such automatic performance of this portion of the method eliminates human judgement from the process, which is often flawed by lack of expertise or non-scientific prejudgment. The actual printed result can easily be predicted via a conventional proofing process because of the existence of the correct profiles and the representative modified target curves.

Referring now to FIGS. 5A-5D in more detail, a preferred embodiment will be described.

Step 1: Select the Optimal Screen Suited for the Flexo Condition, Taking into Account Plate Making Limits.

Unlike traditional prior art methods in which the minimum dot is set from curves, embodiments of the invention comprise setting the minimum dot using a screen that contains a FM part and an AM part. This screen selection is preferably automated from measurements. The description that follows illustrates an exemplary implementation.

First, a specific printing condition is specified from a plurality of printing condition parameters. Exemplary printing conditions may include settings related to press (brand, type, print speed, cylinder width, anilox to plate impression, plate to substrate impression), substrate (materials, opacity, thickness), imager (type, optics, resolution, pixel boost setting), exposure (type, power), plate (type, thickness, relief depth, hardness, developer), printing standard, ink (set (e.g. CMYK), and brand, type, viscosity for each ink color), anilox for each separation (brand, type, line screen, angle, cell volume.), and screen linearization for each separation (e.g. ruling in lpi). The condition may be specified by entry of the various parameters into a computer processor programmed with instructions for storing the information in memory and using the information in an expert system that processes the information.

Figure 6:
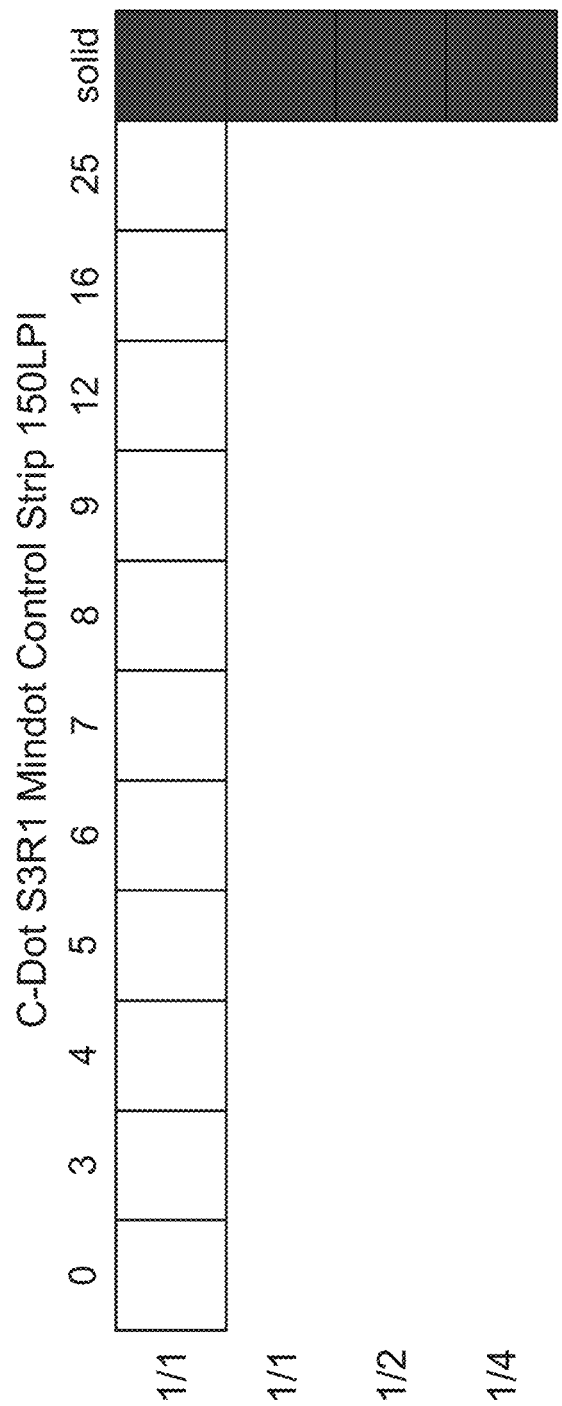
FIG. 6 depicts an exemplary Mindot control strip.
Figure 20:
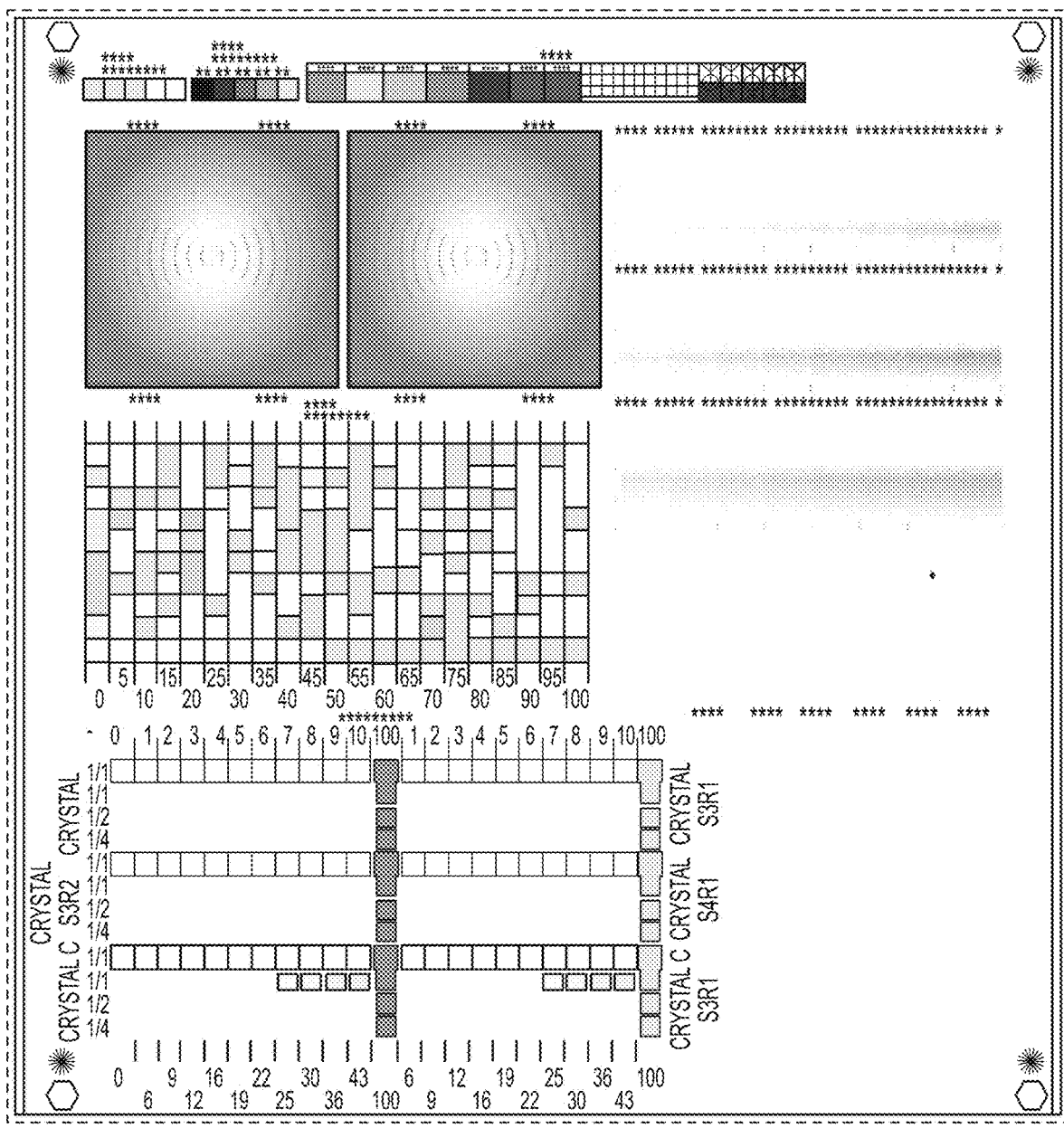
FIG. 20 depicts an exemplary bitmap generated for printing in accordance with one exemplary implementation of aspects of the invention.
Figure 21:
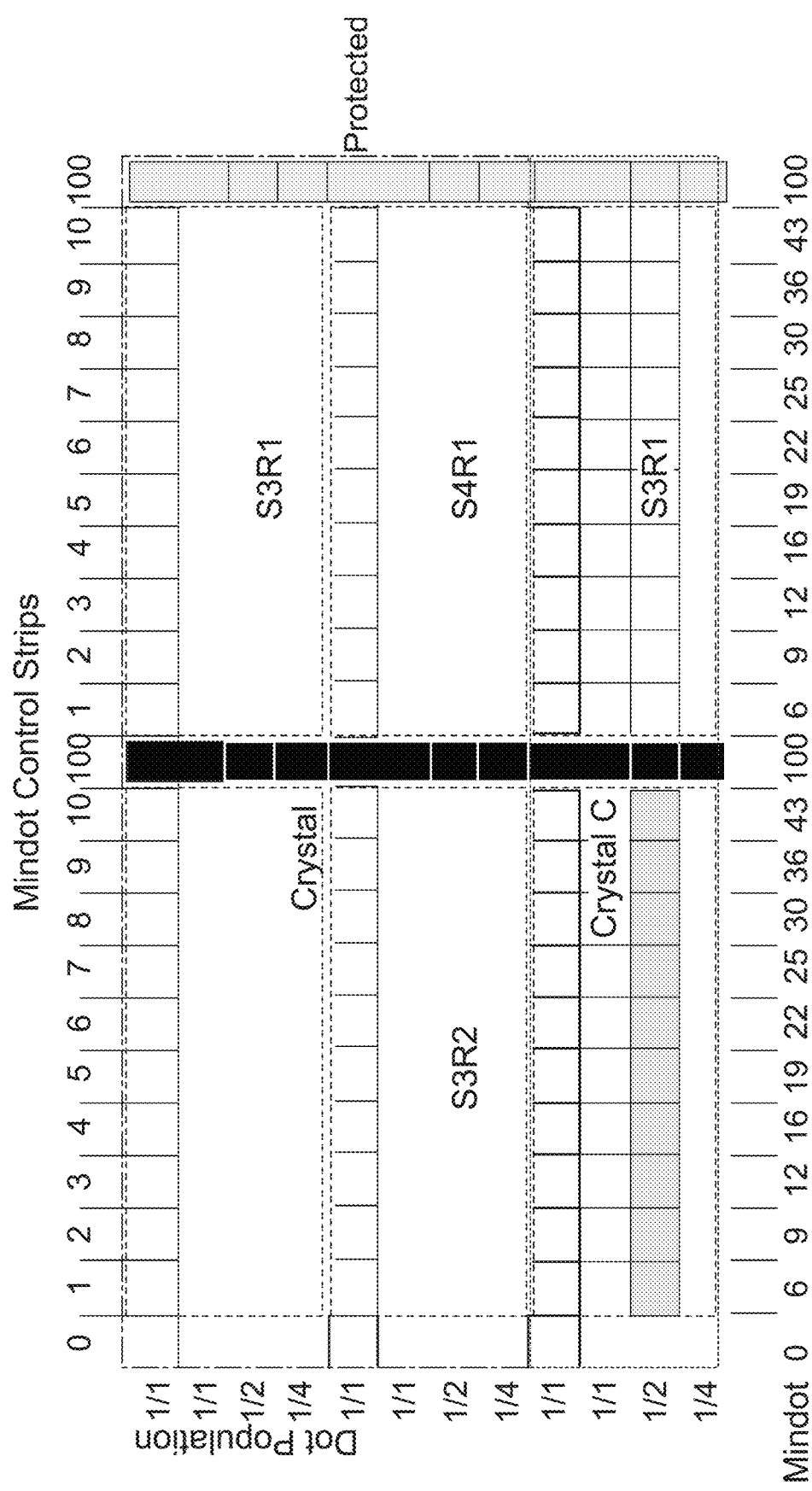
FIG. 21 depicts a magnified portion of an exemplary mindot control strip section of a bitmap such as the bitmap of FIG. 20.
Figure 22:
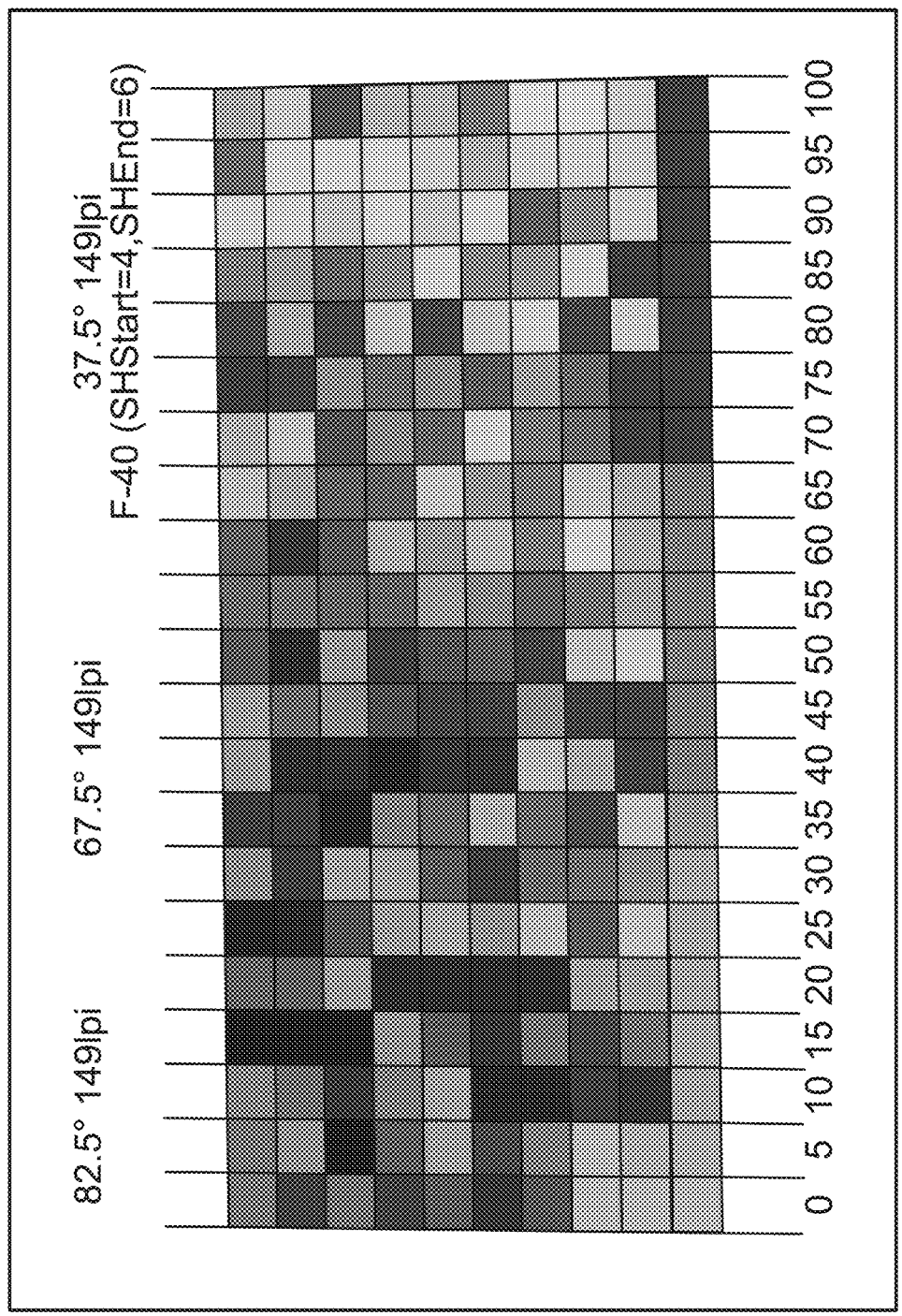
FIG. 22 depicts an exemplary tone chart printed from the tone chart section of a bitmap such as the bitmap of FIG. 20.
Figure 23:
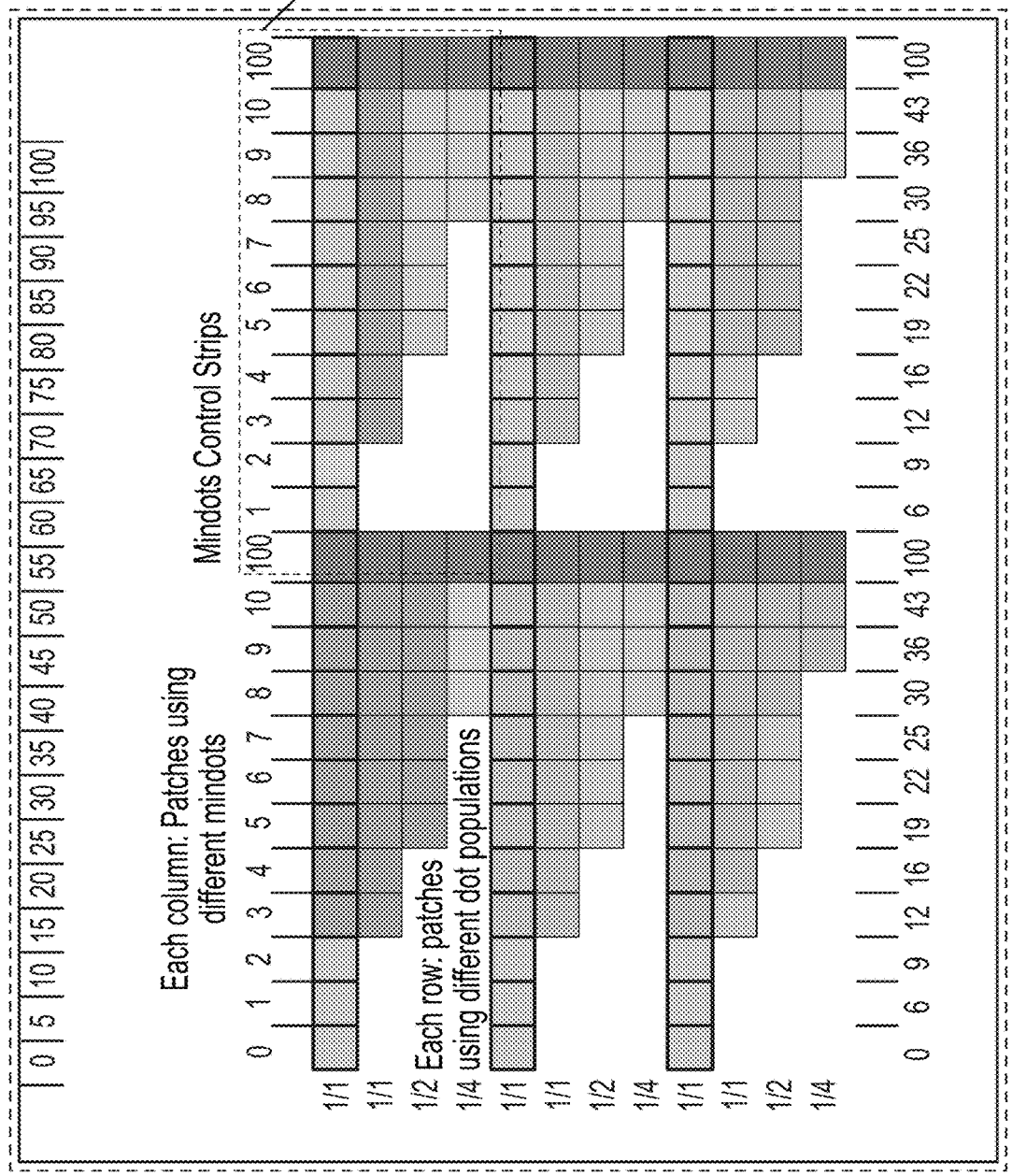
FIG. 23 depicts an exemplary printed mindot control strip section of a bitmap such as the bitmap of FIG. 20.

The information may be used to specify a plurality of dedicated "mindot" control strips, an example of which is depicted in FIG. 6, for printing. The mindot control strips are generated for a specific output resolution and a specific screen ruling. These values are among the printing condition parameters. The output resolution is determined from imager capabilities, whereas the screen ruling is determined from required job quality. The mindot control strips may be part of a tailored bitmap, such as the bitmap shown in FIG. 20, with specific sections automatically selected for inclusion based upon the input printing condition, so that the information printed in the bitmap will generate useful measurements. Thus, for example, the Mindot portion of the bitmap may include 6 different mindot strips, each printed using a different screening technology (e.g. different variations on Esko Crystal™ Technology, as depicted in FIG. 21). "Crystal™ Technology," generally, is discussed in Published PCT Application No. WO2017/203034A1, titled METHOD FOR SMOOTHER TONAL RESPONSE IN FLEXOGRAPHIC PRINTING, incorporated herein by reference. Exemplary screening technologies, nomenclature, and exemplary portions of mindot control strips using the exemplary screening technologies, are discussed in more detail in Appendix I. As depicted in FIG. 6 and in an exemplary printed result for one separation in FIG. 23, each column represents a patch using a different mindot and each row represents a patch using different dot populations. It should be noted that although depicted in graytone in the figures, each separation is printed using an ink corresponding to one of the colors of ink in the ink set (e.g. Cyan, Magenta, Yellow, and blacK in a CMYK ink set).

The mindot strips are measured automatically and tone values are compared for different dot sizes, different dot populations and different screening technologies. FIG. 6 depicts an exemplary mindot control strip for one screening technology. The different columns in the strip indicate different dot sizes (e.g. column labeled '3' contains patches that use 3-pixel dots), the different rows use different dot populations (E.g. the row labeled "½" contains patches where half of the dots have been removed). Tone values for all the patches/cells are measured and a stable minimum dot is calculated by analyzing these values, using specific criteria and logic. Exemplary criteria include:

Selecting the absolute metric and formula used to calculate tone value. The selection is based on optimal precision and linearity. For example, tone value may be calculated from color (spectral data), using CIE76 color differences, to have accurate readings for light tints and to have linear and proportional behavior in tone value when changing dot size and/or dot population.

Figure 7:
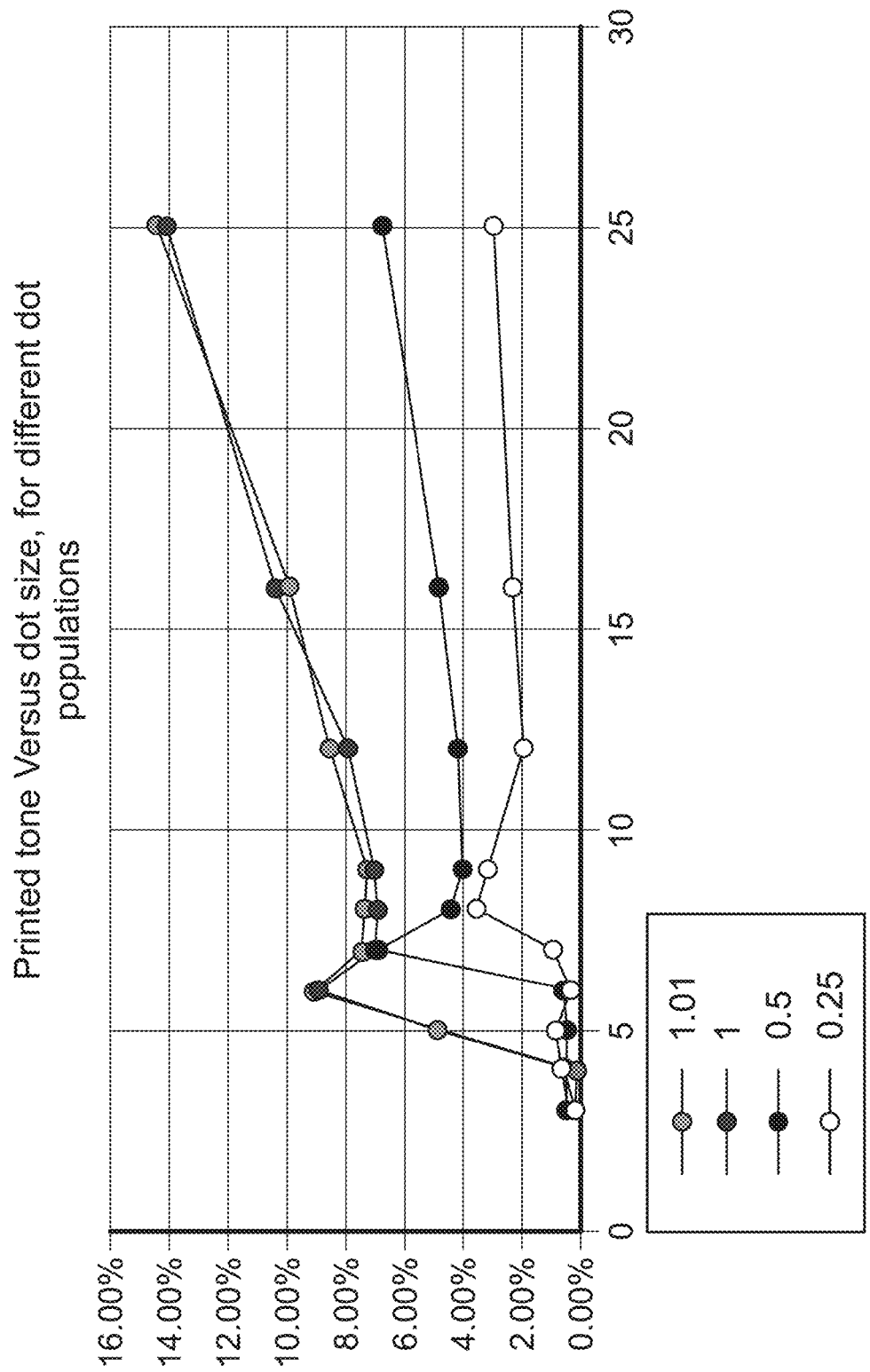
FIG. 7 depicts graphs of printed tone versus dot size for different dot populations for an exemplary printing condition.

Analyzing the slope of the tone values curve for different dot sizes and dot populations, such as is depicted in FIG. 7, with slope defined as the value of a lower dot size compared to the tone value of the treated dot size. Starting from the largest dot, when the slope reaches a specific minimum, smaller dots are rejected as candidate for a stable minimum dot.

Dot population: For a specific dot size for a given screen ruling, wherein it may be desirable to reduce the number of dots to further reduce tone (FM part of the screen), this criteria explores how many of the dots can be removed from the screen grid without losing stability or introducing tone reversal. The slope for such populations is analyzed as mentioned in the previous topic, but also the tone values for the different populations are compared. Thus, for example, when half of a dot population remains, the tone value should measure about half of the tone value compared to the full population.

Using the foregoing criteria may result in multiple solutions, including the smallest stable dot at full population or a less smaller dot at a reduced population. Both give stable solutions, but result in different minimum tone values or different visual appearance (less dot population perceived as a lower screen ruling in highlights). A decision may be made based on preferences, set by the user, or selected from specific printing condition characteristics, or selected by the implementation as optimal defaults.

Thus, for the example depicted in FIG. 7, the following solutions are possible:

Minimum dot=9 pixels, at 1/1 population, resulting in 7% TV

Minimum dot=12 pixels, at ½ population, resulting in 4.18% TV

Minimum dot=16 pixels, at ¼ population, resulting in 2.4% TV

Figure 8:
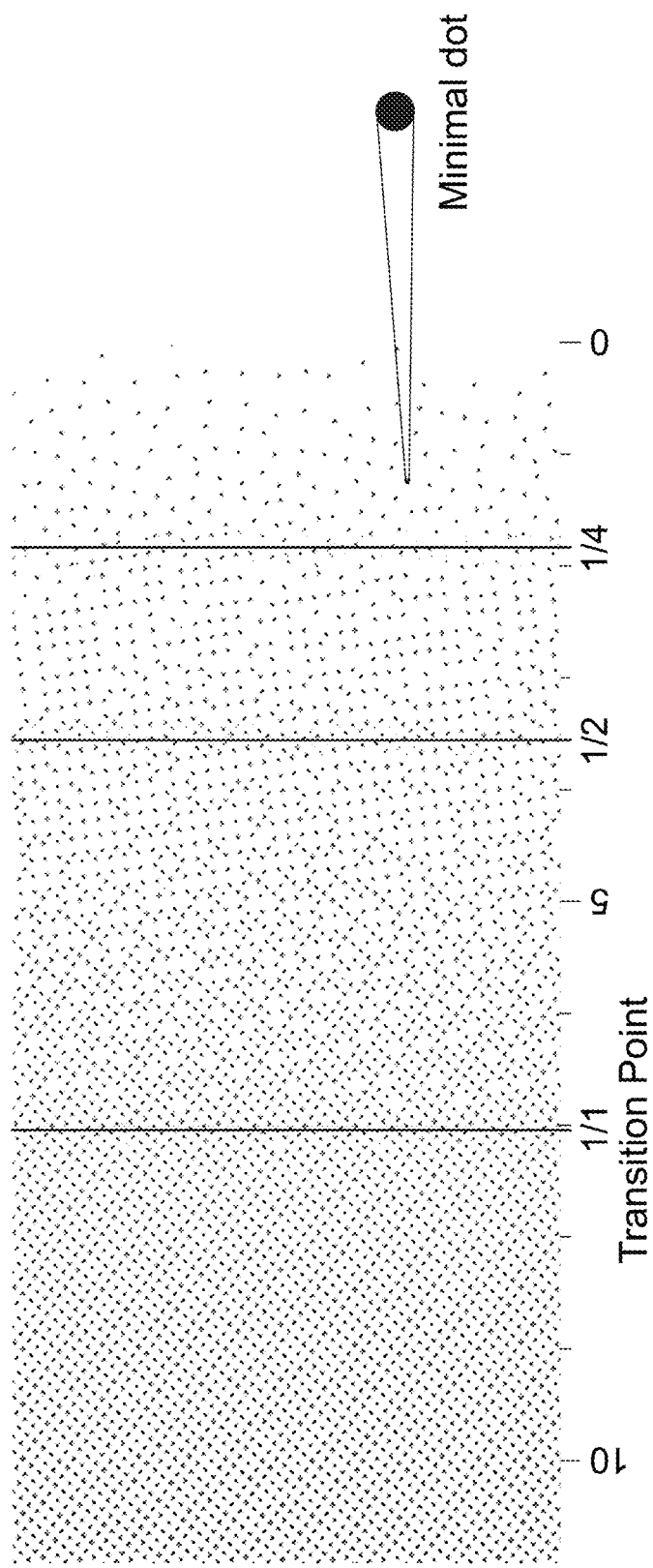
FIG. 8 depicts an exemplary transitional screen (from AM to FM) having a transition point matching a minimum dot.

A preferred implementation may select the $2^{nd}$ solution by default, as TV is low enough without reducing population too much. When the dot size is decided, a transitional screen is created with its transition point matching the minimal dot, such as is depicted in FIG. 8. For tones below the transition, gray level is modulated by changing the population of minimal dots. For tones above the transition, gray level is modulated by increasing dot size above minimal dot. The reduced dot population selected for the specific minimum dot is not set in the screen but set in the curve, explained in the next topic.

Figure 24:
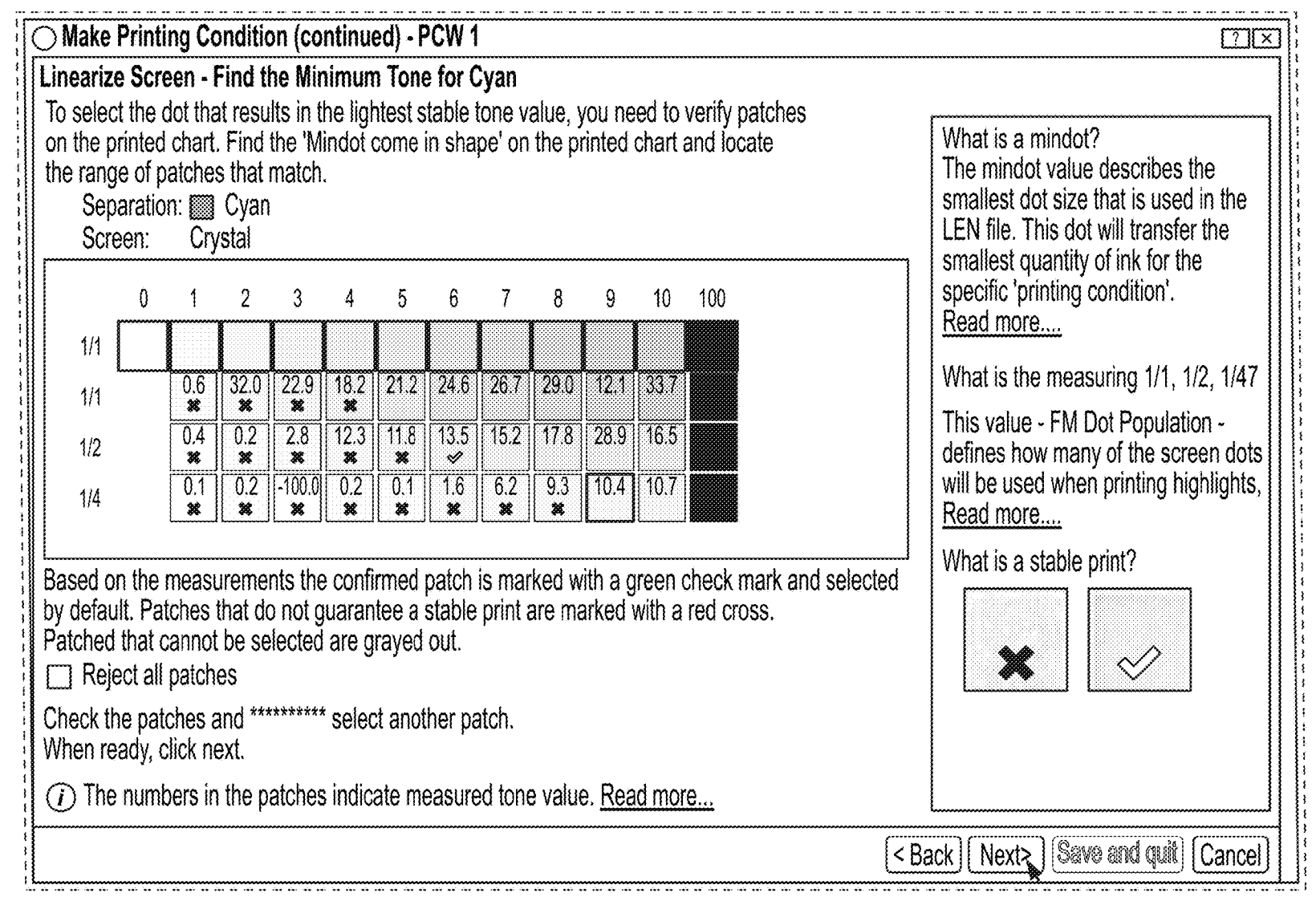

Preferably, after inputting the print conditions, the bitmap is generated and printed, and then the measurements are automatically made from the printed bitmap. The automatic measurements are then input to the same expert system that generated the bitmap, and those measurements are used for recommending the optimum screen. The expert system may include a graphical user interface from which the user can visualize the minimum dot recommended, as depicted in FIG. 24, which shows unsuitable mindot sizes with an "x" and the recommended mindot size and population with a check mark.

Step 2: Select a Suitable Target Curve and Measurement Metric for the Selected Condition and Ink.

In this step a metric and formula are determined for extracting tone value from measurements. Also a target curve is selected that matches the selected metric and formula, and that is suitable for the selected condition and ink. The following default selections are made in the exemplary embodiment:

Density may be used as the metric used to measure process color tones (C,M,Y,K), in which case the Murray/Davies formula is preferably used to calculate tone values from measurements.

The target curve selected for process inks may be ref.dgc, a curve shape close to the TVI-B ISO curve (standard curve used for ISO FOGRA39 printing conditions, as illustrated in FIG. 1).

Color (CIELab) may be the metric used to measure spot color tones, in which case the formula to calculate tone values for spot colors is SCTV, and the target curve selected for these spot colors is a linear curve.

In a more advanced mode, a user may have the option to select a different target curve for a different ink and/or a different metric and formula to extract tone values. This may be useful if it is desired to match a specific standardized or reference printing condition. For example, if the printing condition is standardized to FOGRA43, TVI-E may be used as target curve for C,M,Y and TVI-F may be used as the target curve for black In another advanced mode, a user may have the option to select a reference profile as target instead of having to derive individual desired curves for each ink, such as is known in prior art implementations, such as Esko CurvePilot™. In that case, the tone value curve for each process ink is automatically extracted from that profile and used as the desired curve for that ink, similar to the function of Curve Pilot. In the example depicted in FIG. 9, for example, a user selected 'P_EQ_Press2_Smooth_SyncT' as a reference press profile to match. The Tone Value curve for each process ink is extracted from the profile, using spectral data and applying the appropriate density filter for the specific ink.

Step 3: From Measurements and from Screen Properties, Derive Limits for Gray Levels and Limits for Tone Scale.

From the measurements in STEP 1, the following properties are derived:
- The gray level of the screen from which modulation changes from FM to AM ("Transition Point"). This gray level is set during screen creation (the gray level where the modulation type changes). For example, in the above example, a 150 LPI screen was used at 4000 PPI, and the selected dot was 12 pixels. The gray level for this transition point is at 1.7%.
- The Tone Value measured and calculated from the patch that was screened with the selected minimum dot size. In the example above, the patch with 12 pix dots measured 7.9% TV. This value was obtained by measuring the Lab value of the patch and comparing it with Lab of paper and solid (ΔE76 formula).
- The population for which the minimum dot prints stable enough.
- In the example above ½ population was selected for the 12 pix dot.
- The gray level of the screen for this population. This is equal to the gray level of the transition Point of the screen multiplied by the population ratio. In the example above, the gray level=1.7%*½=0.85%.
- The Tone Value measured and calculated from the patch made from the selected dot and the selected dot population. This tone value is the lightest tone that can be printed for this condition. In the example above, the patch with 12 pix dots at ½ population measured 4.18% TV.

Step 4: Modify the Target Curve from the Derived Limits in STEP 3 so that this Curve Reflects the Best Realistic and Reproducible Tonal Response for the Given Print Condition.

In STEP 2, the proper target curve was selected for the specific condition and for the selected ink that is being linearized. However, this desired curve typically shows a continuous monotone increasing tone response from 0% to 100%. However, printing in flexo has discontinuities near 0% (there is a minimal reproduceable tone), and tone can start decreasing near 100%, so the desired curve cannot be realized. In this step, the target curve is modified so that the desired value at the starting point of the curve corresponds with the lightest tone value obtained in STEP 3. In one embodiment, we combine the target curve with a transfer curve, with this transfer curve created in such a way that the combined curve evolves away from the original curve in the smoothest way, with the least complex function. This transfer curve is obtained by using a power function with the following criteria.

Parameters:
a=offset at start of modified curve=the lightest obtainable tone value
b=exponent of the power function
Power function: $F(x)=a+x^b$
$x_i$=Intercept=point where transfer curve changes into an (*) identity curve (*) identity curve: a transfer curve that does not affect output: $F(x)=x$;

Criteria 1: At intercept, the slope of the transfer curve is 1. From that point onwards, the transfer curve always has slope=1.

$$F(x)=a+x^b => F'(x_i)=bz^{(b-1)} \text{ (1}^{st}\text{ derivative of the function)} \quad (2)$$

$$F'(x_i)=1 \text{ (Criteria 1: 1}^{st}\text{ derivative of the function=1)} \quad (3)$$

From Eq. 2 and Eq. 3:

$$bx_i^{(b-1)}=1 \quad (4)$$

$$x_i=(1/b)^{1/(b-1)} \quad (5)$$

Criteria 2: The function value at intercept becomes equal to the x-value. From that point onwards, the transfer curve becomes an identity curve (x=y).

$$F(x_i)=a+x_i^b \quad (6)$$

$$F(x_i)=x_i \text{ (Criteria 2: } x_i=y_i) \quad (7)$$

From Eq. 6 and Eq. 7:

$$x_i=a+x_i^b \quad (8)$$

$$x_i-x_i^b=a \quad (9)$$

This provides two comparisons, see (5) and (9), with two unknowns: intercept $x_i$ and exponent b. The comparisons may be solved in a heuristic way by choosing a starting exponent b=2.0 with intercept $x_i$ calculated according to criteria 1, and exponent b adapted until criteria 2 is met within 0.00001.

What follows is an example implementation of the power function described above:

```
// Find exponent and intercept of the power transfer function
// RequiredShiftUp = a
// tangentX = xi
// expo = b
double getExponent(
    double RequiredShiftUp,     // Lightest reachable Tone Value
    double &tangentX            // intercept with identity curve
)
{
        double incr = 1.0;
        double expo = 2.0;
        double reqMove = RequiredShiftUp;
        for(;;)
        {
                double power = (double)1.0 / (expo – 1.0);
                double connectX = pow((1.0 / expo),power);
                double yatconnectx = pow(connectX,expo);
                // Y at connect point
                double estMove = connectX – yatconnectx;
                // shift estimated
                double diff = abs(estMove – reqMove);
                if (diff <= 0.00001) break; // power function found
                if(estMove > reqMove)
                {
                        incr /= 2;
                        expo -= incr;
                {
                else
                }
                        incr *= 2;
                        expo += incr;
                }
        }
        tangentX = connectX;
        return expo;
}
```

Combination of target curve and power transfer function is implemented in the following way:
For x=0 to $x_i$
    y_PowerTransfer=a+$x^b$
    Y=TargetCurve(y_PowerTransfer)
For x=$x_i$ to 100%
    y_PowerTransfer=x
    Y=TargetCurve(y_PowerTransfer)

Figures 9, 10:
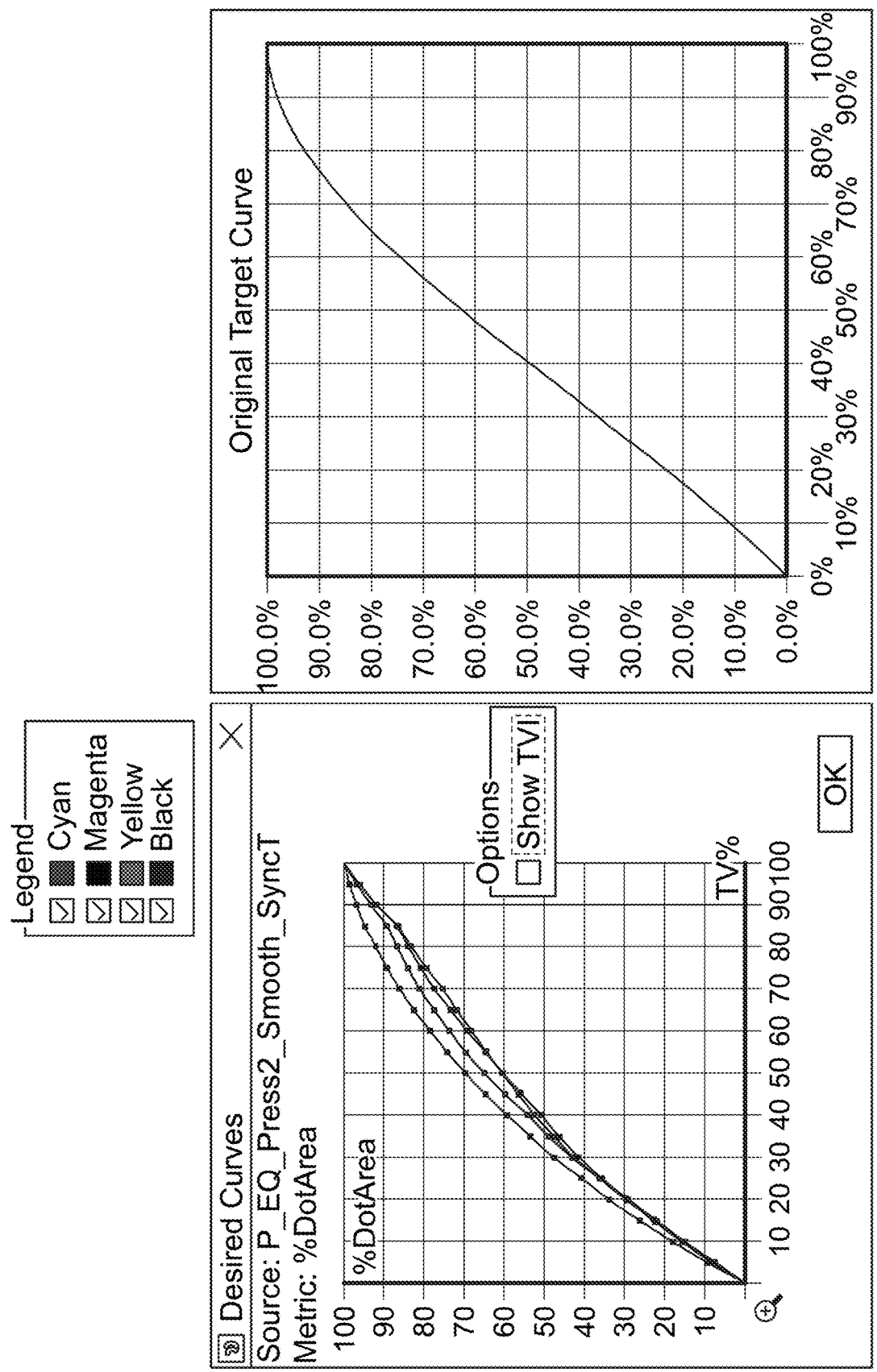
FIG. 9 depicts an exemplary user selected press profile as a reference press profile to match, showing tone value curves for each process ink extracted from the profile.
FIG. 10 depicts an exemplary target curve.

What follows is a worked out example for a specific condition and ink using the target curve depicted in FIG. 10 and having the following target curve so formula:

TargetCurve(x)=$x+x^2-x^3$

From previous steps the following lightest tone value was obtained:
Optimal highlight: Minimum dot 12 pixels, used at ½ of the AM population
Measured: 4.98% TV (lightest obtainable tone value for this condition)

We want to create a modified target curve that is lifted by 4.98%, using the method and example implementation as described above.

First, we search for the intercept and exponent of the power transfer function from the function as documented in the example implementation:
double tangentX;
double expo=getExponent(0.0498,tangentX):
Result:
=>expo=1.1457
=>tangentX=39.31%

The following power transfer function is obtained:
Intercept: 39.31%
Power function $1^{st}$ part of the curve: 4.98%+$x^{1.1451}$
$2^{nd}$ part of the curve: x=y Secondly, we combine the original curve with the power transfer function as documented in the sample implementation:
For x=0 to 39.31%
  y_PowerTransfer=4.98%+$x^{1.1451}$
  Y=TargetCurve(y_PowerTransfer)
For x=39.31% to 100%
  y_PowerTransfer=x
  Y=TargetCurve(y_PowerTransfer)

Figure 11:
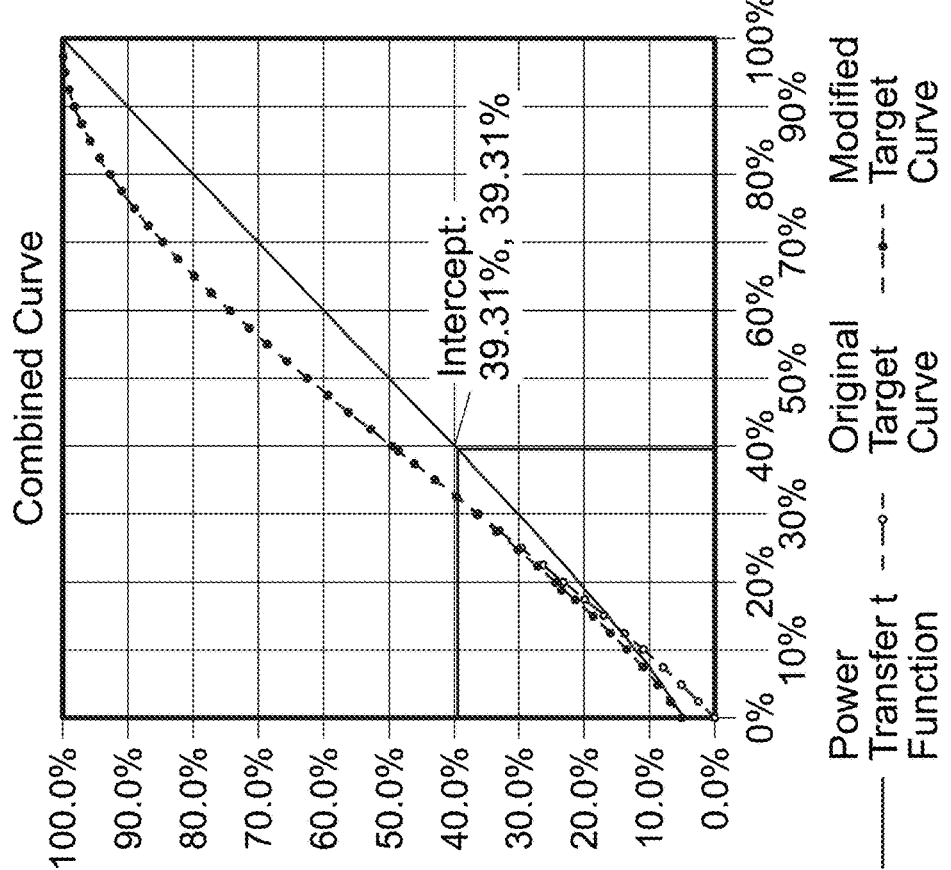
FIG. 11 illustrates an exemplary power transfer function.
Figure 12:
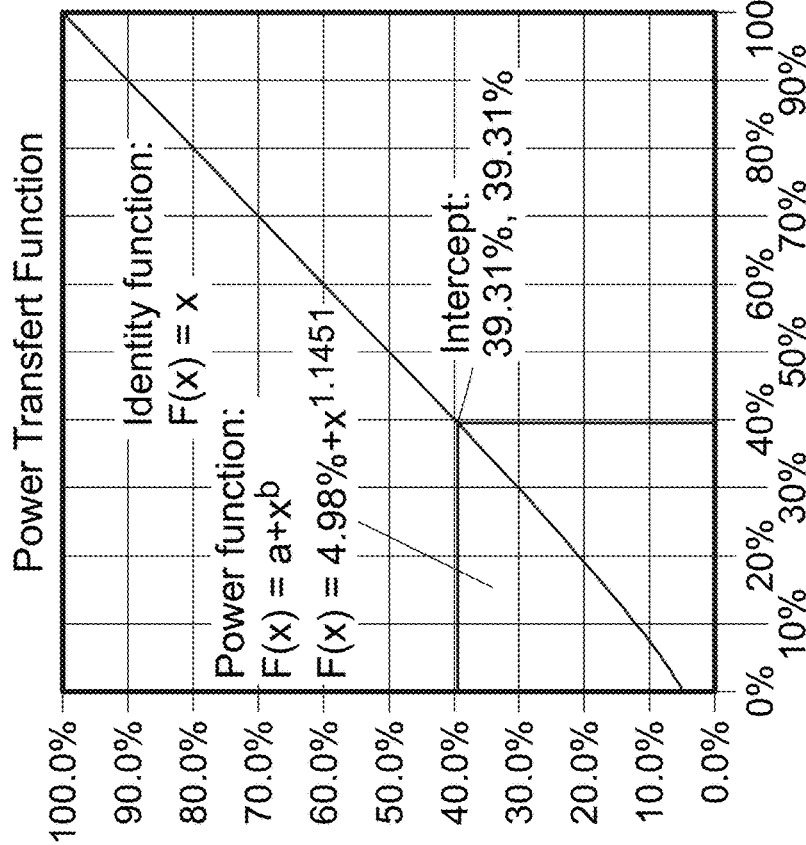
FIG. 12 illustrates an exemplary combination of the target curve of FIG. 10, the power transfer function of FIG. 11, and a combined curve defining a modified target curve.

FIG. 12 shows the 3 curves: Original target curve (same as depicted in FIG. 10), Power transfer function (same as depicted in FIG. 11), and combined curve=modified target curve.

Step 5: Calculate Theoretical Adjustment Curve

An adjustment curve models the relation between gray levels in the screen (digital file) and printed tone values. This curve is influenced by many parameters (e.g. screen type (FM/AM, ruling, spot function), ink type, substrate, etc.). Creating a function from all these parameters is impossible, or at least not practical, so the adjustment curve is found in an empirical way. By measuring tone values printed from different gray levels and adjusting these gray levels towards a reference tone scale (=modified target curve).

This is called 'compensating' and is done in the following way:
x=gray level
Desired(x)=desired tone values
Measured(x)=measured tone values
Adjustment(x)=adjusted tone values
=>Adjustment(x)=Measured$^{-1}$ (Desired (x))

Figure 13:
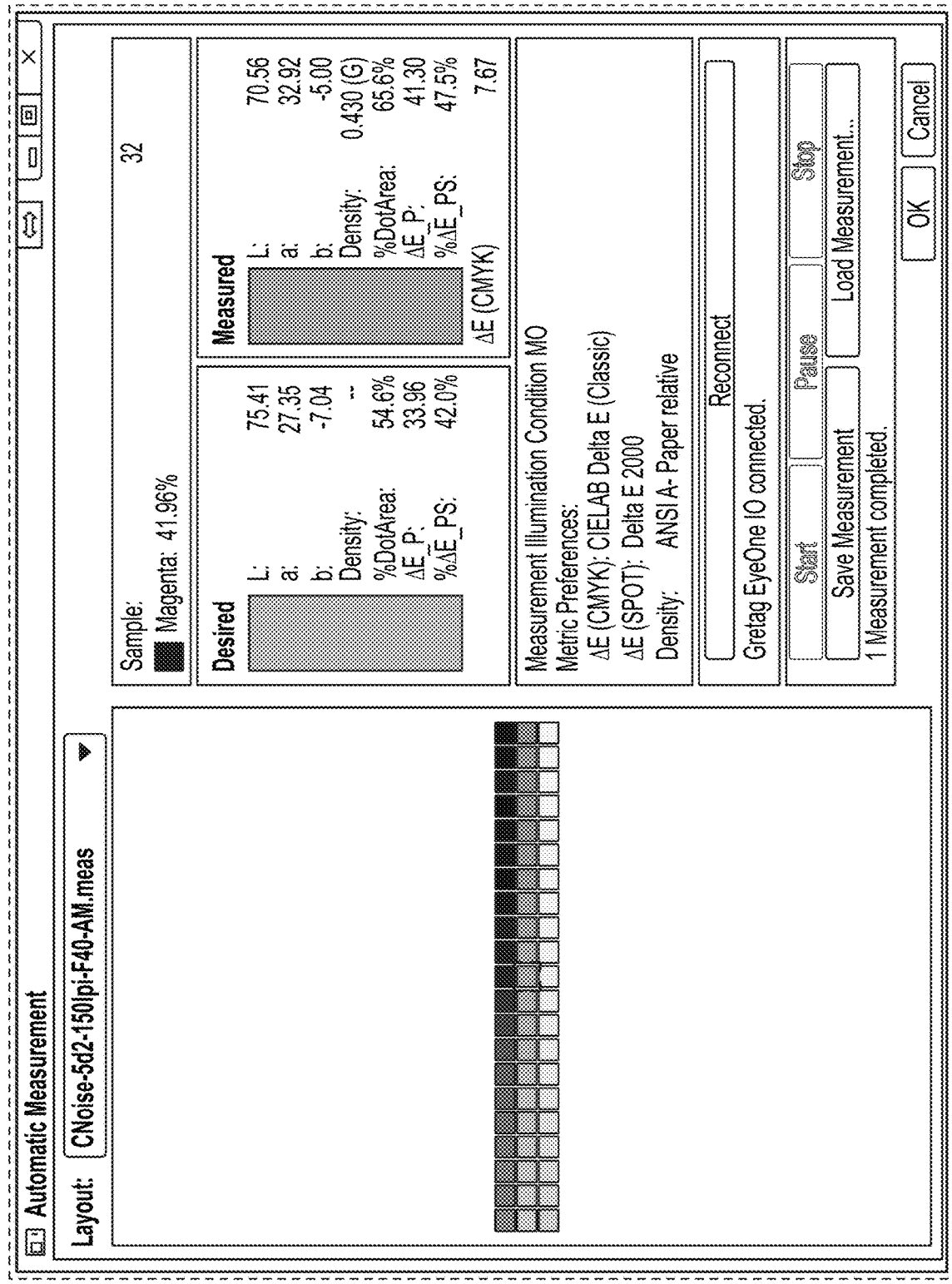
FIG. 13 depicts an exemplary linearization control strip containing patches with different tints over a complete tonal range, as displayed in an exemplary computer software user interface.

Clarification of this Formula:
The gray level (=Adjustment) to be used for a tone x is found by
  Looking up the desired value for that tone x from the modified target curve (=Desired(x))
  And by reverse-lookup in the measurement curve, finding the gray level that printed that desired value for x (Measured−1( ))
  e.g. 68% TV was printed with a gray level of 45%
  The desired value for a 50% tint is 68%
  =>Adjustment(50%)=45%, because the 45% gray level measured exactly 68%, which is the aim for a 50% tint What follows is an implementation to obtain step 5:

For this step a linearization control strip is used, such as is depicted in FIG. 13 as part of an exemplary computer software user interface. This strip contains patches with different tints over the complete tonal range. Ideally, this control strip is generated using the screen found in the previous step. However, that would require an extra print run. Therefore, we use a control strip that is generated with a screen using the same screening technology, but without a transition point. Such a strip can be printed together with the mindot control strip from the previous steps. When the strip is measured, only tones above the transition point, found from the previous steps, are considered. Tones below the transition point are linearized from (X1,Y1) to (X2,Y2) in the following way:
Tone1=Transition Point*population
TV1=Tone Value lightest stable patch (selected minimum dot at population)
Tone2=Transition Point
TV2=Tone Value Transition Point Tone values below Tone1 are set to zero. For each tone measured above Tone1, an adjustment is calculated as described above:
x=tone
Adjustment(x)=MeasuredCurve$^{-1}$(ModifiedTargetCurve (x))

The MeasuredCurve function is a function that makes a curve from measured points whereby x=the graylevel of a patch and y=the measured tone value of a patch. This function also supports reverse lookup: for a measured value y, what was the gray level used?

The adjustment curve is formed by connecting all the adjustment points. This curve represents the theoretical tonal adjustment curve which would, theoretically, when used in plate making, make the printing process reproduce very accurately said modified target.

Figure 14:
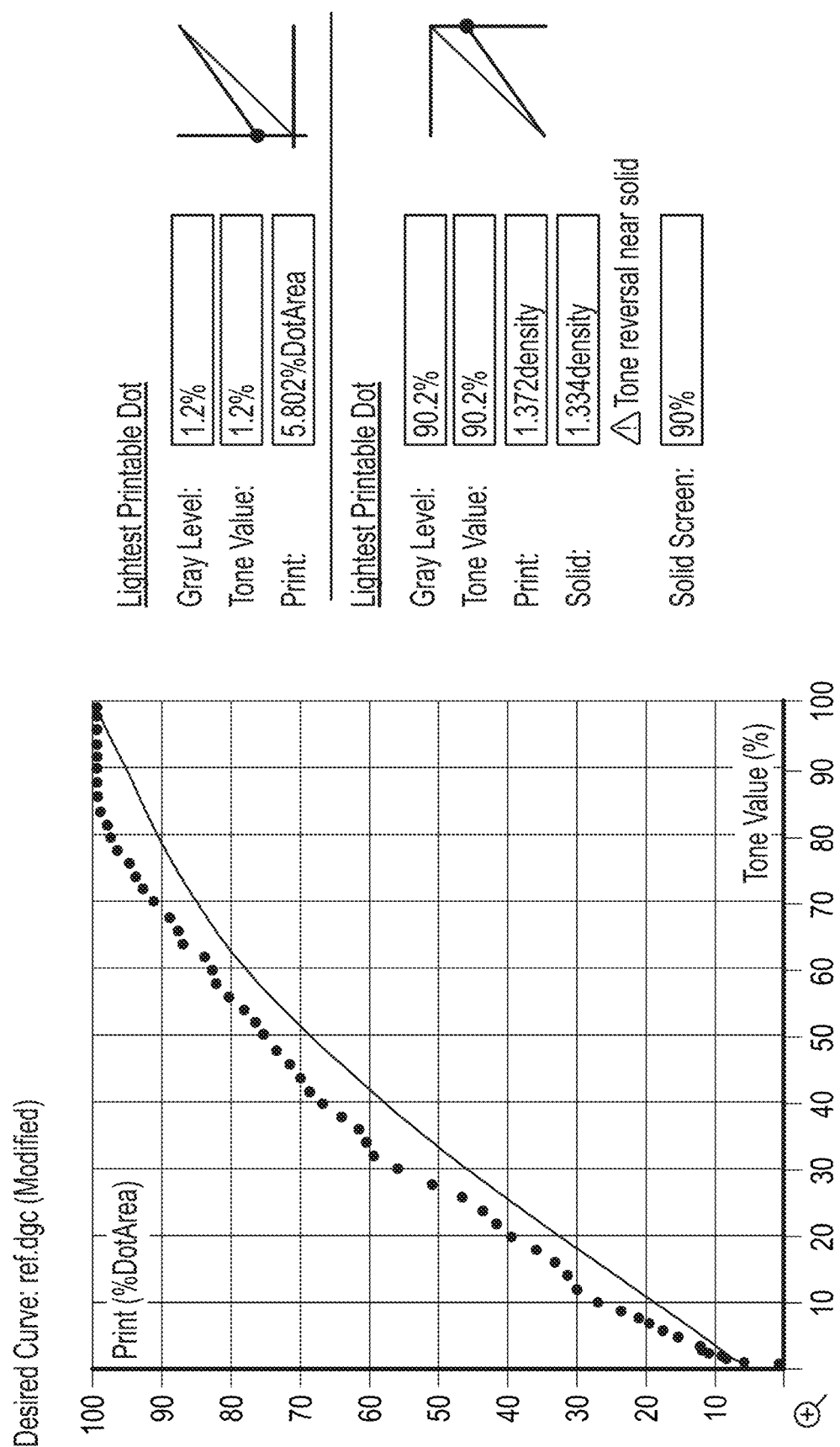
FIG. 14 depicts an exemplary graph showing different measured tone values (y-axis) for different tones (x-axis) as dots, and a modified desired curve represented by a solid line, along with exemplary inputs for the lightest printable dot and darkest printable dot, as displayed in an exemplary computer software user interface.

FIG. 14 depicts an exemplary graph showing different measured tone values (y-axis) for different tones (x-axis) as dots. The modified desired curve is represented by the solid line (the starting point of the curve is shifted up by 5.802%) and the resulting adjustment points ("lightest printable dot" and "darkest printable dot" graphs shown to the right in FIG. 14).

Figure 15:
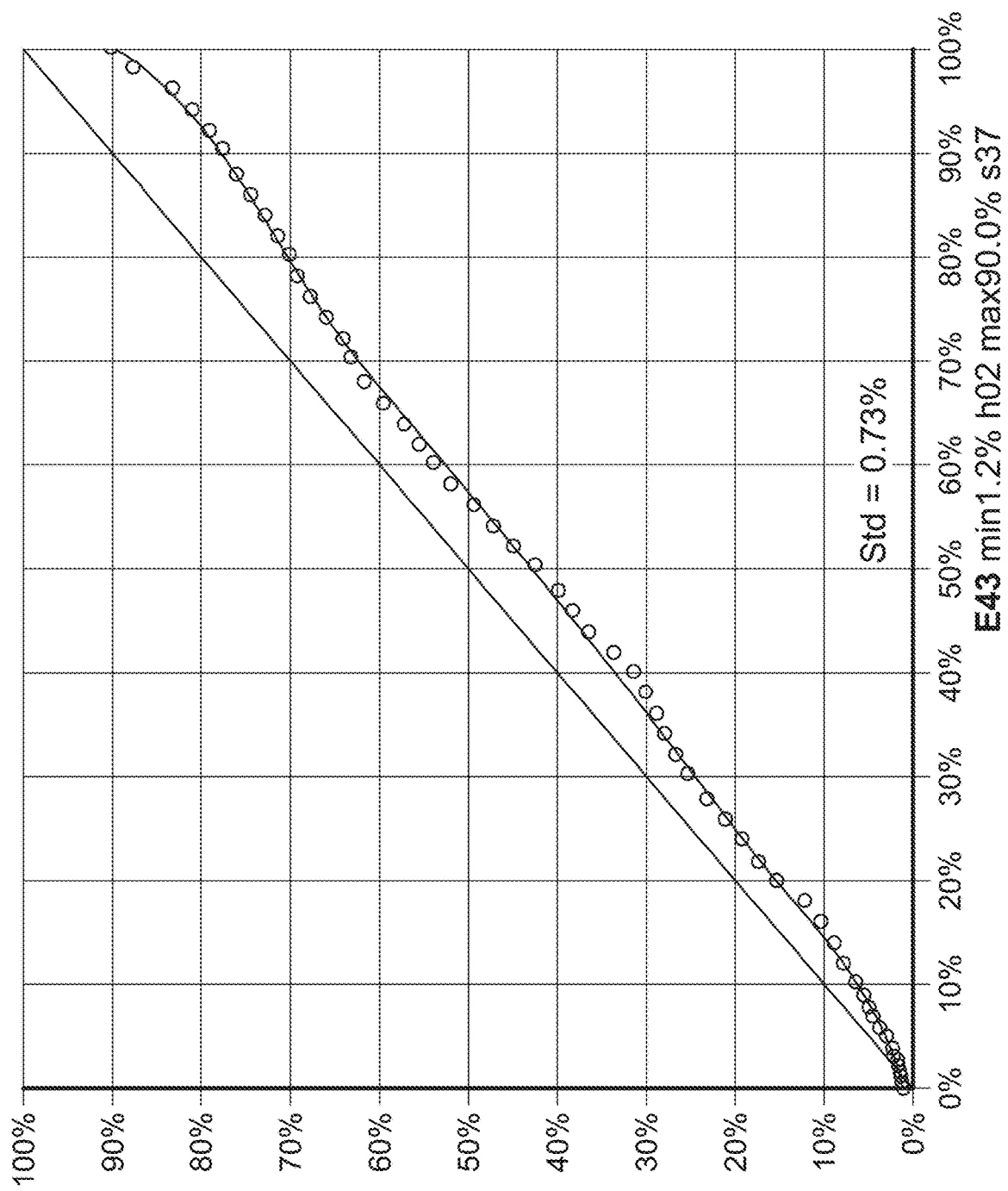
FIG. 15 depicts an exemplary adjustment curve fitted to measured tones as represented as unfilled circles, in accordance with an embodiment of one aspect of the invention.

The calculated adjustment for each measured tone is represented as the unfilled circles in the graph depicted in FIG. 15. As is visible in FIG. 15, connecting the adjustment points at the start of the curve does not result in a flat shape.

Figure 25:
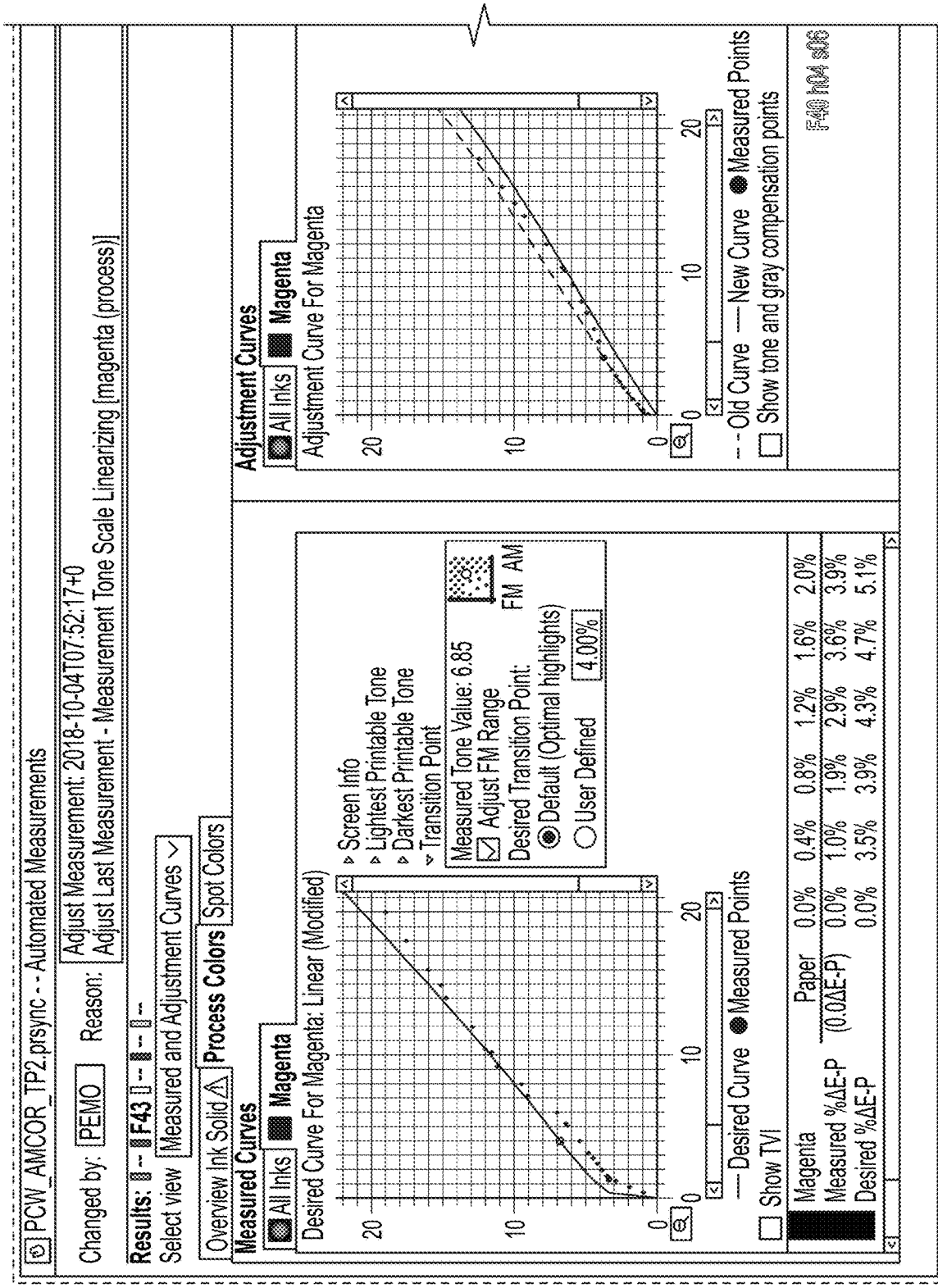
FIG. 25 depicts an exemplary user interface illustrating implementation of an optimal transition point.
Figure 25:
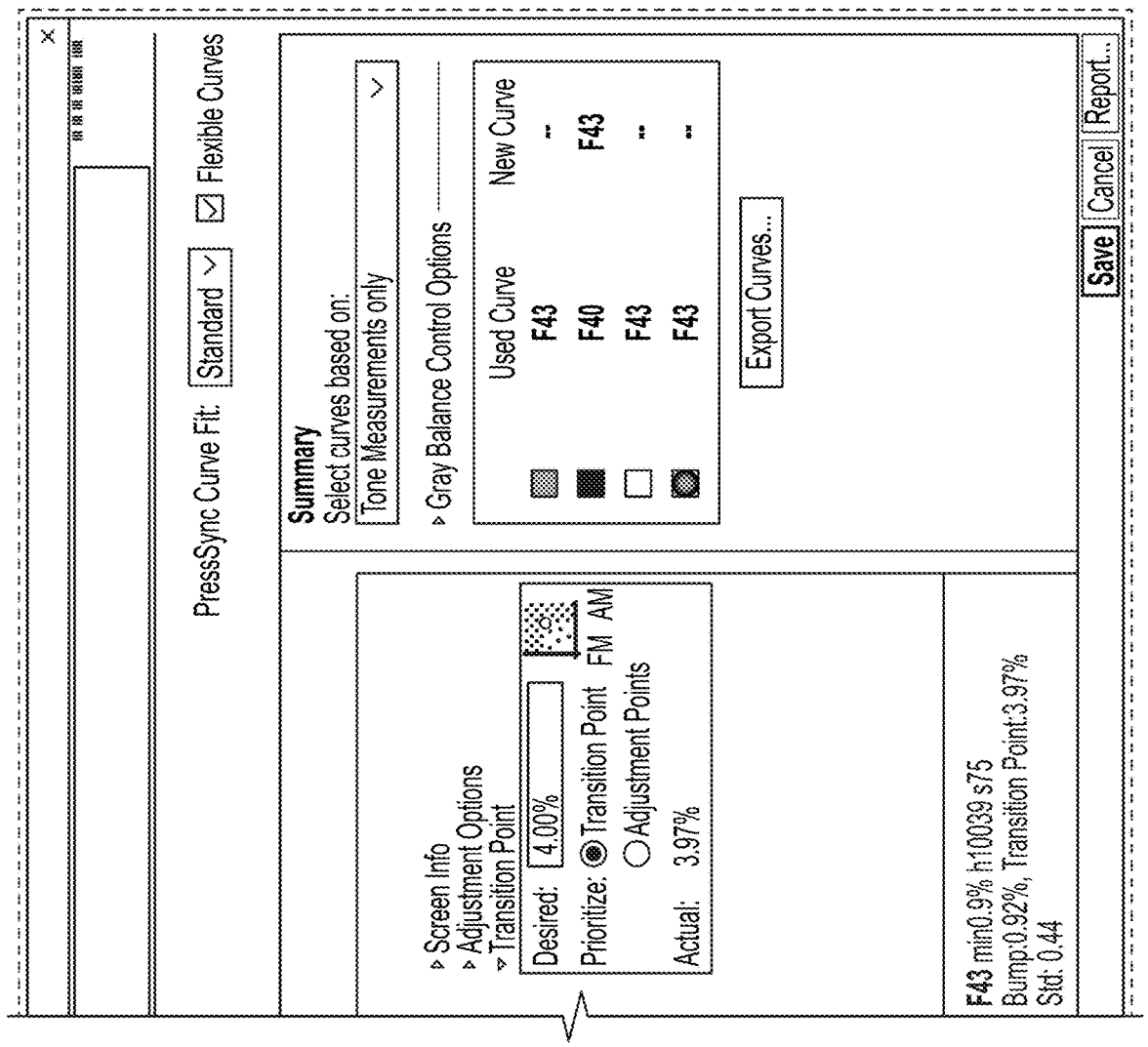

In some embodiments, it may be desired to optimize the tone at which the transition point falls, for example, to control graininess, prevent FM in critical tone range, to maintain a desired contrast after lifting the modified target curve, or for any other beneficial reason. Embodiments of the invention may therefore include automated control of this transition point. As illustrated in FIG. 25, implementing such control comprises creating the modified target curve by modifying the original (non-modified) target curve with two points: the measured tone value of the minimal stable gray level (e.g. the lightest printable dot, as described above) (first modified point), and the measured tone value of the optimal transition point gray level (second modified point). The optimal transition point tone is defined as the point (X,Y) wherein the Y-value is the printed tone value of the transition point, such as may be measured automatically (e.g. the gray level generated from a calibration chart), and the X-value is selected such that the slope at the start of the modified curve (slope at the first modified point) is the same as the slope at the start of the unmodified curve (at 0,0).

Modifying the curve with the two points as described above can be implemented in the following way:

Selecting a first part of the curve to be a second order polynomial from the first modified point to the second modified point, Selecting a second part of the curve to be a power function from the second modified point fading to the original (unmodified) curve.

The optimal X-value for the second modified point can be determined in as follows:

1 Choose a starting X-value for the second modified point (Y-value is known).
   A good starting value for X is constructing a line through the first point with a slope equal to the unmodified curve, and calculating a point on that line for which the Y-value is equal to the measured tone value at the transition point.
2 Calculate the coefficients of the second order polynomial, using the following knowns:
   First modified point element of function,
   slope at first modified point known (=slope of unmodified curve at 0,0) second modified point known (chosen)
3 Calculate the power function with second modified point.
4 Calculate the slope at the second modified point (transition point) for both the second order polynomial and the power functions.
   The second modified point intersects the two functions, and to have a continuous curve the slope at this point for the two functions should be equal.
5 If the slopes are different, choose a new X-value in the following way: If slope at the transition point for the $1^{st}$ function is larger than for $2^{nd}$ function, then increase the X-value, otherwise decrease X-value and redo the above method from step 2 onwards.
6 If the slopes are equal, the chosen X-value becomes the optimal tone (X-value) of the transition point.

In other embodiments, such as the embodiment illustrated in FIG. 25, the user may have the option to directly set the transition point rather than having the optimal transition point automatically calculated using the algorithm described above.

Step 6A—Define a Set of Pre-Determined Curves Suited for Adjusting Conditions with Tone Range Limits.

The adjustment curve obtained from the previous step would adjust tone response perfectly to the desired curve where the condition is perfectly repeatable (stable). In practice, however, printing has its natural fluctuations, such that adjusting with the theoretical curve would create instability and oscillations. Therefore, a curve method is used whereby the calculated adjustment points are 'matched' towards a set of pre-defined curves.

Figure 16B:
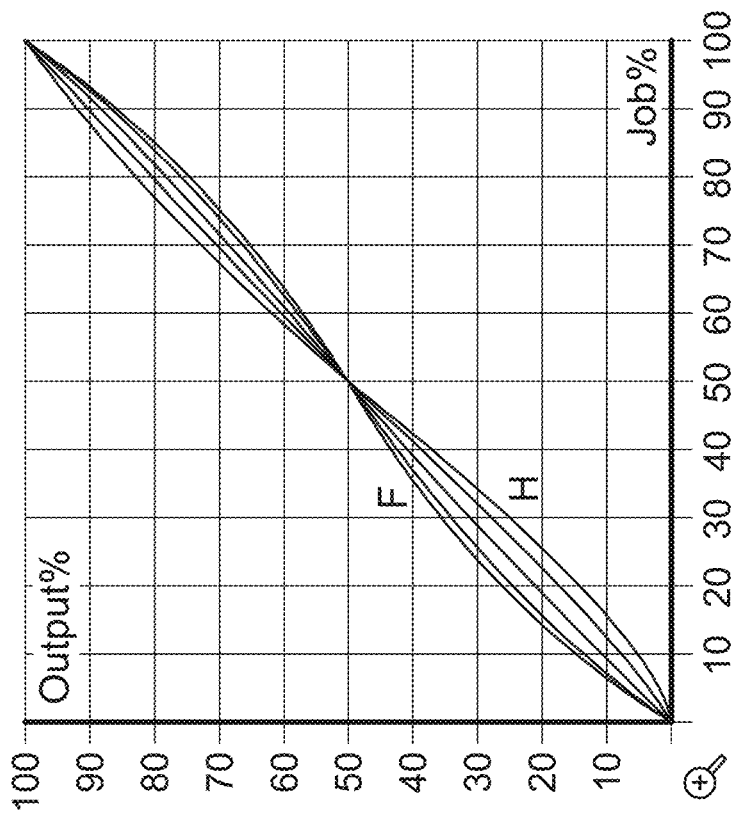
FIG. 16B depicts exemplary PressSync™ curves embodying a set of midpoint slope adjustment curves with alphabetical labels.
Figure 16A:
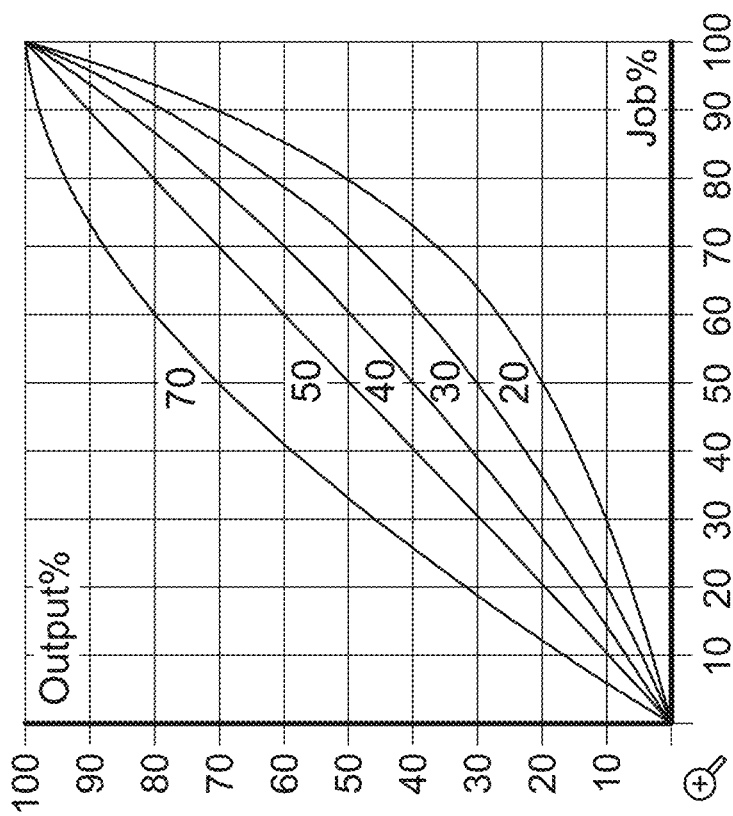
FIG. 16A depicts exemplary PressSync™ curves embodying a set of midpoint adjustment curves with numeric labels.

It is known in the art to match points to a set of simple, pre-defined curves. See, e.g., U.S. Pat. No. 8,717,627, assigned to the assignee of this invention, incorporated herein by reference, embodied in the PressSync™ function available in Esko products. A set of simple PressSync™ curves identifies one curve from two parameters: the midpoint adjustment (the adjustment for a 50% tone) and the midpoint slope (the slope of the curve at 50%). The midpoint adjustment is indicated by a number, as depicted in FIG. 16A, and the midpoint slope is indicated by a letter, as depicted in FIG. 16B.

The typical set of fixed PressSync™ curves, however, assumes a linear behavior from 0% to 100% and uses curve shapes that are not suitable for conditions that have tone range limits. One aspect of the present invention comprises an extended set of pre-defined curves developed to be more suited for adjusting conditions with tone range limits. This extended set of pre-defined curves may be referred to as "Flexible PressSync Curves."

It should be understood that "adjustment curves" should not be confused with "modified target curves." Adjustment curves relate gray levels of the screen and their printed tone value, whereas target curves express desired values of the printed tones values of linear tone scales. Adjustment curves match the model (gray level versus printed tone value) best as possible, whereas target curves must result in printed tone scales that match the profile. In many cases the preferred tone scale in a profile is one that is as linear in color as possible, so that measured points are color equidistant (interpolation accuracy in highlights, midtones and shadows). Therefore, adjustment curves will typically have more complex shapes as compared to target curves (e.g. when using hybrid screens, the relation of gray level and printed tone value in the FM part will be different than in the AM part).

What follows is an example implementation of the set of extended curves.

Figure 17B:
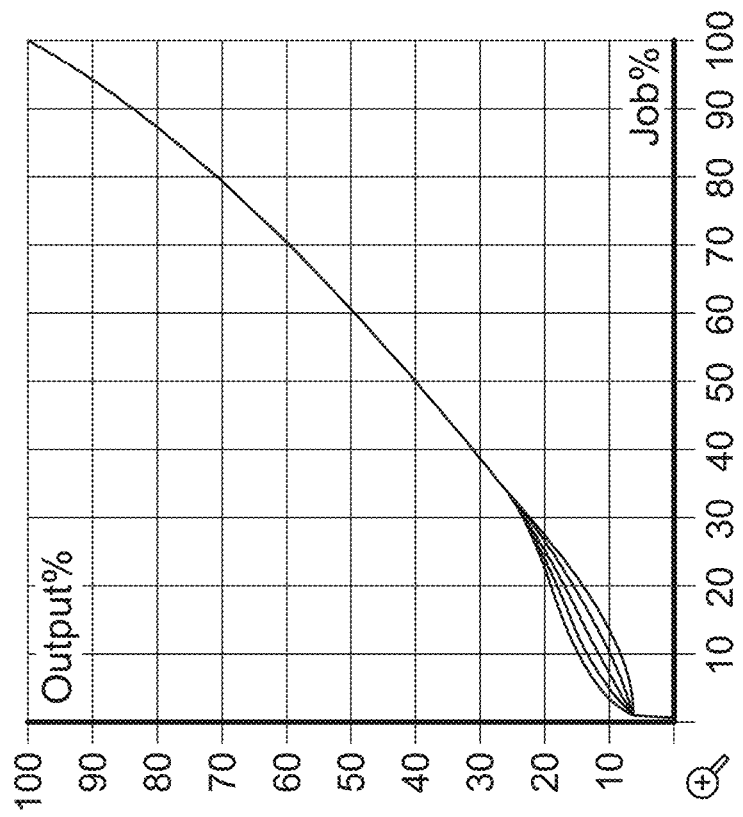
FIG. 17B depicts exemplary different highlight curve section slopes, between a minimal slope of 5 degrees to a slope of 80 degrees.
Figure 17A:
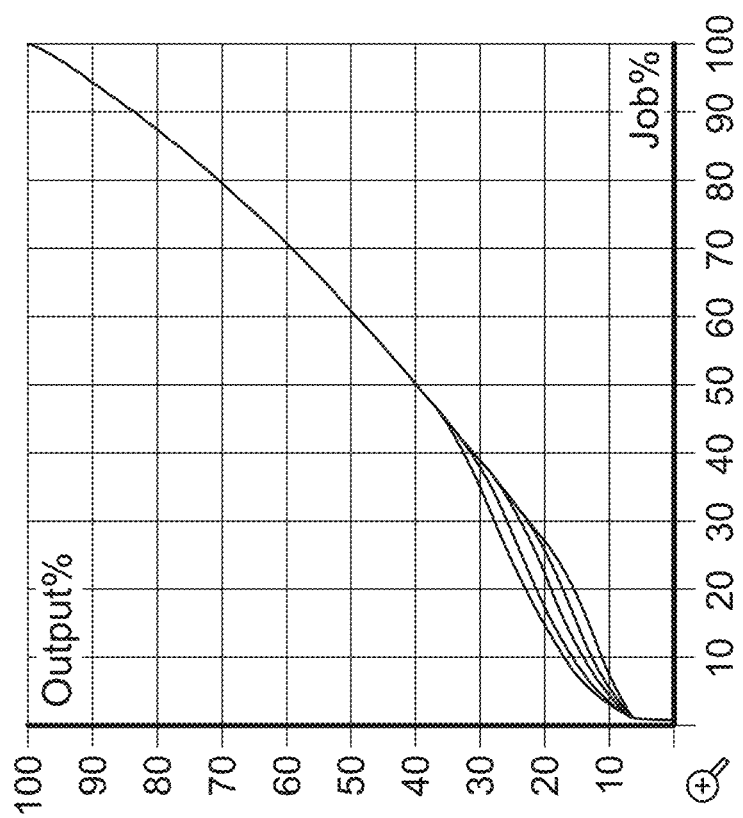
FIG. 17A depicts exemplary highlight curve sections corresponding to different intersection points with the basic curve section between 25% to 49%.
Figure 17D:
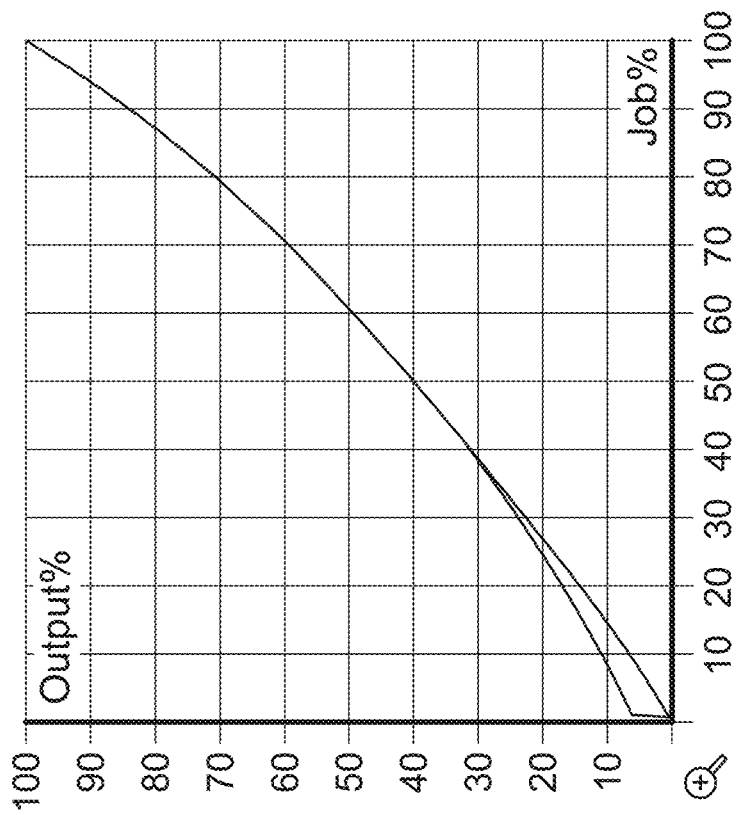
FIG. 17D depicts an exemplary starting point X of an extended curve corresponding to a minimum tone of 0.8%.
Figure 17C:
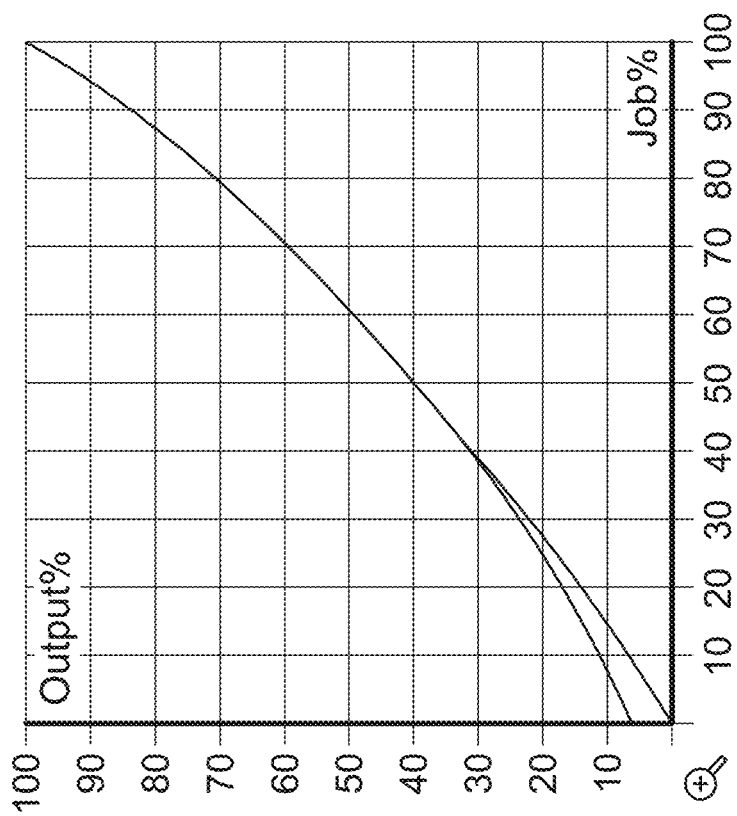
FIG. 17C depicts an exemplary starting point of an extended curve corresponding to a minimum printed tone value of 6%.
Figure 18:
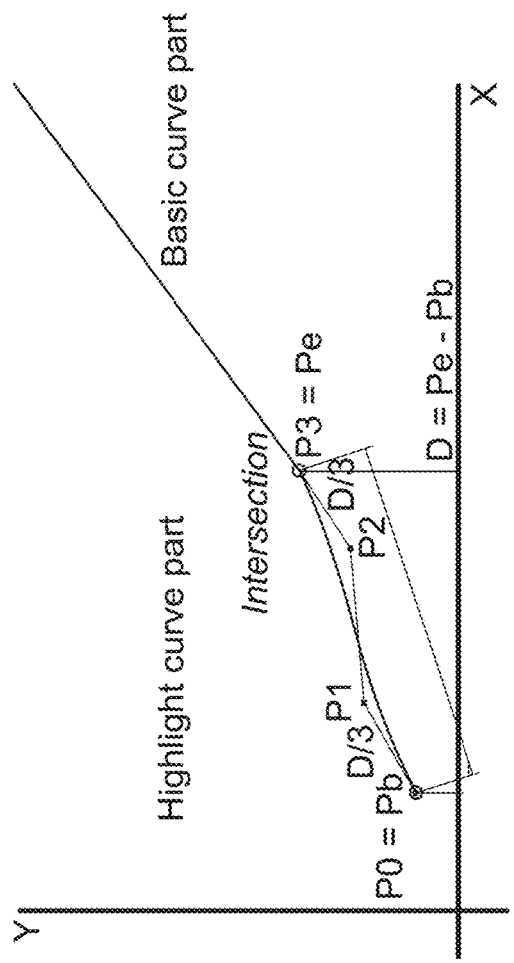
FIG. 18 depicts an exemplary construction of a Bézier curve for a highlight section of an exemplary curve in accordance with one aspect of the invention.

1. Define a range of intersection points with basic PressSync™ curves. For example, the extended curves depicted in FIG. 17A have 9 intersection points with the basic PressSync™ curve between 25% to 49%.
2. Define a range of starting curve slopes. For example, the extended curves depicted in FIG. 17B have 9 different slopes, starting from a minimal slope of 5° up to a slope of 80°
3. Define parameter Pb(x,y)—the starting point of an extended curve.
   Pb_y ("Minimum Value")=7% (lowest gray level of the screen is 7%), as depicted in FIG. 17C.
   Pb_x ("Keep 0% to =0.8%")=>Adjust all tones from 0 to 0.8% to 0%, as depicted in FIG. 17D.
4. For a given starting point Pb (x,y),
   a) For each intersection Pe in the range of intersection points,
   b) For each starting slope Pb_slope in the range of slopes,
   c) For each basic PressSync™ curve defined in the set of basic PressSync™ curves:
      i. Calculate the slope of Pe for the basic PressSync™ curve (=Pe_slope)
      ii. Construct a Bézier spline (Bézier curve) from the starting point Pb to the point Pe, as illustrated in FIG. 18. Bezier curves are well known in the art, such as are described in the Wikipedia entry for "Bézier curve," provided as Appendix II, and incorporated herein by reference.
         P0=Pb
         P1=Obtained by constructing a line going through Pb and having the slope Pb_slope, and at ⅓ of the distance between Pb and Pe
         P2=Obtained by constructing a line going through Pe and having slope Pe_slope, and at ⅓ of distance between Pb and Pe
         P3=Pe
      iii. An exemplary implementation to obtain one extended curve shape may be expressed as:

```
double [ ] SetupCubicBezierCurve(CCurvePoint const & inPb, CCurvePoint const & inPe)
{
    CCurvePoint thePb;
    CCurvePoint thePe;
    thePb = inPb;
    thePe = inPe;
    CCurvePoint thePm(inPm);
    mP[0] = thePb;
    mP[3] = thePe;
    mP[1].slope = thePb.slope;
    GetCrossPoint(thePb, thePm, mP[1]);
    mP[2].slope = thePe.slope;
    GetCrossPoint(thePm, inPe, mP[2])
    return mP;
}
double GetCubicBezierY(double mP[ ], double inX) const
{
    // cubic spline: P0, P1, P2 and P3
    //   t = 0 .. 1
    // X = (1-t)^3*P0x + 3*(1-t)^2*t*P1x + 3*(1-t)*t^2*P2x + t^3*P3x
    // Y = (1-t)^3*P0y + 3*(1-t)^2*t*P1y + 3*(1-t)*t^2*P2y + t^3*P3y
    // we have X, in order to calculate Y, we need to solve t=f(X) cubic function
    // => f(t) = t^3*(3*P2x-3*P1x+P0x-P3x) + t^2*(3*P3x-6*P2x+3*P1x) + t*(3*P2x-3*P3x) + P3x - X
    if (inX<mP[0].x)
        return 0.0;
    if (inX>mP[3].x)
        return 1.0;
    double a = 3*mP[1].x - 3*mP[2].x + mP[3].x - mP[0].x;
    double b = 3*mP[0].x - 6*mP[1].x + 3*mP[2].x;
    double c = 3*mP[1].x - 3*mP[0].x;
    double d = mP[0].x - inX;
    double t1,t2,t3;
    ToCubicCurve (a,b,c,d,t); // given a,b,c,d coefficients of 3rd order polynomial, get t as variable of spline
    double theY = (1-t)*(1-t)*(1-t)*mP[0].y + 3*(1-t)*(1-t)*t*mP[1].y + 3*(1-t)*t*t*mP[2].y + t*t*t*mP[3].y;
    return they;
}
```

Function of Complete Adjustment Curve:

```
{
// highlight_range = intersection point between highlight part and basic part of the curve
// shadow_range = intersection point between basic part and shadow part of the curve
// midpoint_y = Adjustment of the basic curve at 50%
// midpoint_slope = Slope of the basic curve at midpoint
// highlight curve part
        CCurvePoint thePs('Keep 0% to', 'Minimum Dot'); // starting point of curve
        thePs.slope = 'Requested slope at start of curve';
        CCurvePoint thePh;                              // intersection between highlight curve part and basic curve part
        thePh.x    = 'Requested   intersection   with   basic   curve'
        thePh.y    = GetStandardCurveValue(thePh.x,  midpoint_y,  midpoint_slope);
        thePh.slope = GetStandardCurveSlope(thePh.x, midpoint_y, midpoint_slope);
        mPH[ ] = SetupCubicBezierCurve(thePs, thePh)
        for      (X      =      0      to      highlight_range)
             F(Adjustment Curve) = GetCubicBezierY(mPH, X)
// basic curve part
        for      (X      =   highlight_range   to    shadow_range     )
             F(Adjustment   Curve)   =   GetStandardCurveValue(X,   midpoint_y, midpoint_slope);
// shadow curve part
        CCurvePoint thePs;                              // intersection between basic curve part and shadow curve part
        thePs.x    =    'Requested    intersection    with    basic    curve'
        thePs.y    =    GetStandardCurveValue(thePs.x,    midpoint_y,    midpoint_slope);
        thePs.slope = GetStandardCurveSlope(thePs.x, midpoint_y, midpoint_slope);
        CCurvePoint thePe('Keep 100% to', 'Maximum Dot'); // end point of curve
        thePe.slope = 'Requested slope at end of curve';
        mPS[ ] = SetupCubicBezierCurve(thePs, thePe)
        for      (X      =      shadow_range     to      100%)
             F(Adjustment Curve) = GetCubicBezierY(mPS, X)
}
```

5. For each intersection, an extra curve shape is calculated that produces a simple quadratic curve shape (P1=P2). When Pb=(0,0), the curve formed by this extra shape will be equal to the basic PressSync™ curve. This way, the set of extended PressSync™ curves also includes the set of Basic PressSync™ curves.

From the previous steps a range of extended curves can be constructed. The set of curves is further extended with extra shapes in the shadow part of the curves, in a similar way as the highlight shapes (transposing y=100%−y)

Figure 19:
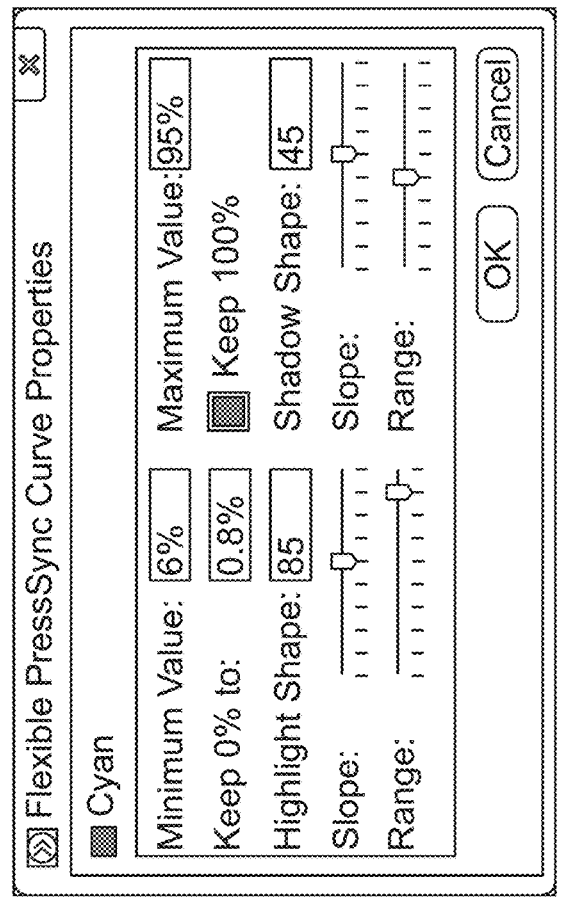
FIG. 19 depicts an exemplary computer software interface implementation for selecting input parameters for fitting a curve in accordance with one aspect of the invention.

Thus, an exemplary computer software interface implementation for selecting one extended curve from its different properties is depicted in FIG. 19, showing the following user-selected parameters.

Minimum Value: Lowest gray level of the screen.
- e.g. min 6.0%: Smallest non-0 tint will use of at least 6%.

Keep 0% to: Tone value range for which adjustment is kept to 0%
- e.g. 0.8%: Tone values between 0% and 0.8% will be dropped to 0% Highlight Shape: Number indicating the highlight shape of the curve.

This number has two digits:
- The $1^{st}$ digit indicates one of the 9 pre-defined intersection points.
- The $2^{nd}$ digit indicates one of the 9 pre-defined starting slopes.
- e.g. h85: The highlight shape of the curve has a slope of 5 and a range of 8. Thus, in this example, there are a total combination of 81 curve shapes (9×9) that can be generated using only the integers 1-9 for each of the $1^{st}$ digit and the 2d digit. The invention is not limited to any particular number of options for the intersection points and starting slopes, or nomenclature for describing the universe of limited combinations, but there are preferably a limited number of such combinations.

Slope: Slider to change the slope of the highlight shape.
Range: Slider to change the range or intersection of the highlight shape with the standard PressSync™ curve shape. The same parameters may be set for analogous shadow shape properties on the right side of the user interface (e.g. Maximum Value, Keep 100%, Shadow Shape, Slope slider, Range slider).

In implementations employing an optimal transition point, as described above with reference to FIG. 25, the adjustment curve may be calculated with the optimal transition point gray level given a relatively greater weight than the measured tone value of the minimal stable gray level. The adjustment curve so derived may be fitted to the PressSync curves with extended highlight shapes.

Step 6B: From the Bundle of Pre-Determined Curves, Find the Curve that Best Matches the Theoretical Adjustment Points.

In STEP 4, the theoretical adjustment points for each measured point were calculated. To obtain the best matching flexible PressSync™ curve, the following steps are taken:
- The 'Minimum dot' property is obtained from STEP 2: the smallest stable gray level derived from the transition point of the screen and the population ratio (e.g. ½). In the example depicted in FIG. 15, the lowest gray level of the screen is set to be 1.2%.
- Optionally the 'Keep 0% to' property can be given by the user to further reduce noise in ct images. By default this value is set at 0.38%. This value makes sure that the first non-zero, 8-bit tone (0.39=1/255) uses exactly the minimal gray level of the screen.
- Similarly, the 'Maximum Dot' is also obtained from the tone scale measurements: It is the gray level that obtains the highest solid density.
- For points between 25% and 75% of the tone scale, the best basic matching PressSync™ curve shape is found. In one embodiment this is done by calculating the sum of the absolute value of differences between the adjustment points and points on a basic PressSync curve. The "absolute value of differences" noted above refers to a difference function used to match a known curve (Flexible PressSync curve) to a set of points. The best matching curve is a curve whereby the sum of differences between points and curve is minimal. The "absolute value of differences" ignores the sign:

$$\text{SumOfAbsoluteDifferences} = \text{SUM}(|y_p - y_c|)$$

$y_p$: y-value of point at $x_i$
$y_c$: y-value of curve at $x_i$

Use of the SumOfAbsoluteDifferences rather than a SumOfSquareDifferences function is that the SumOfAbsoluteDifferences better ignores outliers (because differences are not amplified).

The curve with the lowest sum of differences is selected as best matching. In another embodiment curve selection can be based on smallest standard deviation from adjustment points and curve. The result of this step are two property values of the Flexible PressSync curve: midpoint (number) and slope of midpoint (letter).

For points between 0% and 25%, the best matching highlight shape is found in a similar way. The optimal highlight shape is selected from the lowest sum of differences between adjustment points and highlight shape.

For points between 75% and 100% the best matching shadow shape is found in a similar way. The optimal shadow shape is selected from the lowest sum of differences between adjustment points and shadow shape.

In other embodiments, the method and/or steps for finding the optimal matching curve shapes can vary. For example, the optimal matching curve can be found by calculating the sum of differences over the whole tonal range for each different curve in the complete set of pre-defined curves (combination of midpoint, slope, highlight and shadow shapes), and selecting the curve with the overall smallest difference.

Optionally, the matching may be weighted towards the complexity of the shape of the different curves, such as favoring curve shapes closest to the basic PressSync™ curve. This makes the resulting curve more robust and improves its averaging property to the cost of matching.

In the example depicted in FIG. 15, the best matching curve is found by using the steps as described above. The properties of this curve are displayed in the name of the curve: "E43 min1.2% h02 max90.0% s37"
- midpoint=43%,
- slope at midpoint=E,
- Minimum Dot=1.2%,
- highlight shape=02,
- Maximum dot=90%,
- shadow shape=37

Step 7: Linearizing Other Inks

In one embodiment, the adjustment curve obtained from STEPS 1 to 5, based on measurements for one ink, may be re-used for the other inks. For some printing conditions, however, tone response can be considerably different for different inks. For example:

1. Some darker pigmented inks (e.g. black) show higher dot gain
2. Some inks or separations use different screen technologies—e.g. hexa chrome: For orange a stochastic screen is used to prevent overprint moiré with CMYK. The different screen technologies typically have different tone response and require different adjustments towards linear tones.

In another embodiment, STEPS 1 to 5 are repeated but based on prints and measurements from other ink(s). The result of the complete linearization process is than a set of curves and/or a set of screens, one for each separation.

Step 8: Print with the Set of Curves and Measure a Color Profile

A profile chart can now be printed using the set of adjustment curves. The curve properties of the adjustment curves used can be printed with the calibration chart and can serve as Quality Control parameters. For example, a curve labeled "E43 min1.2%" indicates to a user that in the bitmap or on the plate:

A tone of 50% uses a gray level of 43%, and
The lightest tone should use a gray level of 1.2%.

Screen ruling is typically one of the parameters that identify a printing condition or that is directly related to it (e.g. screen ruling determined from quality requirements, determined from substrate and ink volume—anilox). The strips created and used for the method to derive tone range limits and tone response as described above are therefore ruling-dependent. For example, the mindot control strip generated in STEP 3 is created for a specific screen ruling, because the optimal minimum dot size and population is typically largely dependent on screen ruling. Also, the tone value response (desired and actual) may be ruling dependent.

Similar to screen ruling, output resolution is also considered to be one of the printing condition parameters, and the calibration strips used by the methods may be generated for the requested output resolution. For example, 4000 ppi may be a typical resolution used in common implementations of the invention, without limitation thereto.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for calibrating a printing process, comprising the steps of:
   a) identifying a target tonal response curve for the printing process, the target tonal response curve having a function value for 0 that is non-zero or having a discontinuity between 0 and 10%;
   b) deriving, using curve matching, an adjustment curve that when used in the printing process matches the identified target tonal response curve in step (a), the adjustment curve comprising a basic part, a highlight part that intersects with the basic part, the highlight part derived using a 1-dimensional function having one or more input parameters selected from a limited set of options, the adjustment curve characterized by:
      a starting point having a first x-value and first y-value;
      a highlight curve part having a first slope at the starting point and a first intersection of the highlight curve part with a basic curve part, the first intersection having a second x-value and second y-value, the first slope and the first intersection being among the input parameters selected from the limited set of options; and
      the basic curve part having a midrange point in a middle-range of the adjustment curve, the midrange point having a third x-value and a third y-value respectively greater than the second x-value and second y-value, and having a second slope at the midrange point, the basic curve part selected from a predetermined family of adjustment curves limited in number;
   c) adjusting one or more data values in a digital image input file by applying the selected adjustment curve to produce a digital image output file.

2. The method of claim 1, wherein the adjustment curve further comprises a shadow part that intersects with the basic part, the shadow part derived using a 1-dimensional function having one or more input parameters selected from a limited set of options, the adjustment curve further characterized by:
   a shadow curve part having a third slope at an end point and a second intersection of the basic curve part with the shadow curve part, the second intersection having a fourth x-value and a fourth y-value respectively greater than the third x-value and third y-value, the third slope and the second intersection being among the input parameters selected from the limited set of options; and
   the end point having a fifth x-value and fifth y-value respectively greater than the x-values and y-values of all points on the adjustment curve.

3. The method of claim 1, further comprising determining a function value of the starting point by determining a stable printing gray level.

4. The method of claim 3, wherein determining the stable printing gray level comprises determining a lightest stable printing dot size by automatically measuring and comparing printed tone values for different dot sizes.

5. The method of claim 4, wherein determining the stable printing gray level comprises automatically measuring and comparing printed tone values for different combinations of dot size and dot populations.

6. The method of claim 5, further comprising implementing the lightest stable dot size in a screen and implementing a corresponding dot population as a minimum gray level in the adjustment curve.

7. The method of claim 2, wherein the function value of the end-point is determined from the gray level that prints with a highest density.

8. The method of claim 1, further comprising selecting a reference target tonal response curve for each process ink matching a print condition and reference profile, where the reference target tonal response curve is modified with a highlight point from a power function.

9. The method of claim 1, further comprising selecting an unmodified reference target tonal response curve for each process ink matching a print condition and reference profile, and modifying the unmodified reference target tonal response curve based upon one or more extra points using a predetermined function.

10. The method of claim 9, wherein the one or more extra points comprises a transition point of the screen.

11. The method of claim 10, wherein the one or more extra points comprises a first point comprising a measured tone value of the minimal stable gray level, and a second point comprises the transition point of the screen, wherein the transition point comprises a measured tone value of an optimal transition point gray level with a Y-value corresponding to an automatically measured printed tone value of the optimal transition point, and an X-value selected so that the modified target tonal response curve has a first slope at the first point identical to a first slope at a beginning point (0,0) of the unmodified target tonal response curve.

12. The method of claim 10, further comprising deriving the adjustment curve with the optimal transition point gray level given a relatively greater weight than the measured tone value of the minimal stable gray level in the curve matching step.

13. The method of claim 12, wherein the adjustment curve is selected from a predetermined family of curves, the family comprising a set of predetermined basic curves continuous from 0% to 100%, modified with different highlight part shapes using Bezier spline functions, that allow a variable curve start point other than (0,0).

14. The method of claim 2, wherein the adjustment curve is selected from a predetermined family of curves, the family comprising a set of predetermined basic curves continuous from 0% to 100%, modified with different shadow part shapes using Bezier spline functions, that allow a variable curve end point other than (100,100).

15. The method of claim 1, wherein step (b) comprises any of the following steps:
   i. calculating a theoretical set of adjustment points, the calculation comprising interpolating between measured values to match the target tonal response curve;
   ii. determining the third x-value, third y-value, and second slope of the midtone point by selecting a curve from the family of curves that best matches said adjustment points in a midtone range U to V, where U>15% and V<85%;
   iii. setting the first x-value, first y-value as the starting point identified by determining a stable printing gray level;
   iv. determining the first slope at the starting point and determining the second x-value, second-y-value of the first intersection that when combined with the midtone point, best matches said adjustment points in a highlight range U to V, wherein U>starting point and V<50%;
   v. setting the fifth x-value, fifth y-value to the end point identified by determining a gray level that prints with a highest density;
   vi. determining the third slope at the end point and determining the fourth x-value, fourth y-value of the second intersection that when combined with the midtone point, best matches said adjustment points in a shadow range U to V, where U>50% and V<end point.

16. The method of claim 1, wherein step (b) comprises any of the following steps:
   i. calculating a theoretical set of adjustment points, the calculation comprising interpolating between measured values to match the target tonal response curve;
   ii. setting the first x-value, first y-value to the starting point identified by determining a stable printing gray level;
   iii. setting the fifth x-value, fifth y-value to the end point identified by determining a gray level that prints with a highest density;
   iv. determining all other points and slopes by selecting a combination that best matches said adjustment points in a range U to V, where U>start point and V<end point.

17. The method of claim 1, wherein the printing process comprises a multi-ink printing process, comprising selecting the adjustment curve for a first ink used in the multi-ink printing process and using the selected adjustment curve for a second ink used in the multi-ink printing process.

18. The method of claim 1, wherein the printing process comprises a multi-ink printing process, comprising performing steps (a) and (b) to select a first adjustment curve for a first ink used in the multi-ink printing process, and repeating steps (a) and (b) to select a second adjustment curve different than the first adjustment curve for a second ink used in the multi-ink printing process.

19. The method of claim 1, further comprising printing a printed image from the digital image output file.

20. Non-transitory machine-readable media comprising fixed machine readable instructions for causing a machine to perform the method of claim 18.

21. The method of claim 1, wherein the adjustment curve is selected from a predetermined family of curves, the family comprising a set of predetermined basic curves continuous from 0% to 100%, modified with different highlight part shapes using Bezier spline functions, that allow a variable curve start point other than (0,0).

22. The method of claim 1, wherein the identifying comprises selecting the target tonal response curve from a set of standard tonal response curves or extracting the target tonal response curve from a reference profile to be matched.

* * * * *